(12) United States Patent
Mortensen et al.

(10) Patent No.: US 11,591,215 B2
(45) Date of Patent: *Feb. 28, 2023

(54) HYDROGEN PRODUCTION BY STEAM METHANE REFORMING

(71) Applicant: HALDOR TOPSØE A/S, Kgs. Lyngby (DK)

(72) Inventors: Peter Mølgaard Mortensen, Roskilde (DK); Kim Aasberg-Petersen, Alleroed (DK); Robert Klein, Roskilde (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 0 days.

This patent is subject to a terminal disclaimer.

(21) Appl. No.: 17/049,040

(22) PCT Filed: May 15, 2019

(86) PCT No.: PCT/EP2019/062420
§ 371 (c)(1),
(2) Date: Oct. 20, 2020

(87) PCT Pub. No.: WO2019/228796
PCT Pub. Date: Dec. 5, 2019

(65) Prior Publication Data
US 2021/0238035 A1 Aug. 5, 2021

(30) Foreign Application Priority Data

May 31, 2018 (DK) .......................... PA 2018 00249
May 31, 2018 (EP) .................................. 18175366
Sep. 25, 2018 (DK) .......................... PA 2018 00636

(51) Int. Cl.
*C01B 3/38* (2006.01)
*B01D 53/26* (2006.01)
(Continued)

(52) U.S. Cl.
CPC ............ *C01B 3/384* (2013.01); *B01D 53/265* (2013.01); *B01J 19/0013* (2013.01);
(Continued)

(58) Field of Classification Search
CPC .......... C01B 3/384; C01B 3/40; C01B 3/503; C01B 2203/0233; C01B 2203/0283;
(Continued)

(56) References Cited

U.S. PATENT DOCUMENTS 6,746,650 B1 6/2004 Lesieur
2002/0051741 A1 5/2002 Fumio
(Continued)

FOREIGN PATENT DOCUMENTS

DE 19841993 A1 3/2000
DE 102013226126 A1 6/2015
(Continued)

OTHER PUBLICATIONS

International Search Report (with English Translation) and Written Opinion issued in corresponding International Patent Application No. PCT/EP2019/062420, 14 pages (dated Jul. 23, 2019).
(Continued)

*Primary Examiner* — Steven J Bos
*Assistant Examiner* — Syed T Iqbal
(74) *Attorney, Agent, or Firm* — Buchanan Ingersoll & Rooney P.C.

(57) ABSTRACT

A hydrogen plant for producing hydrogen, including: a reforming reactor system including a first catalyst bed including an electrically conductive material and a catalytically active material, a heat insulation layer between the first catalyst bed and the pressure shell, and at least two conductors electrically connected to the electrically conductive material and to an electrical power supply placed outside the pressure shell, wherein the electrical power supply is dimen-
(Continued)

sioned to heat at least part of the first catalyst bed to a temperature of at least 500° C. by passing an electrical current through the electrically conductive material, where the pressure shell has a design pressure of between 5 and 200 bar; a water gas shift unit downstream the reforming reactor system; and a gas separation unit downstream the water gas shift unit. A process for producing hydrogen from a feed gas including hydrocarbons.

25 Claims, 13 Drawing Sheets

(51) Int. Cl.
| | | |
|---|---|---|
| B01J 19/00 | (2006.01) | |
| B01J 19/24 | (2006.01) | |
| B01J 35/00 | (2006.01) | |
| B01J 35/04 | (2006.01) | |
| C01B 3/40 | (2006.01) | |
| C01B 3/50 | (2006.01) | |
| B01D 53/047 | (2006.01) | |
| B01D 53/14 | (2006.01) | |
| B01D 53/22 | (2006.01) | |

(52) U.S. Cl.
CPC ....... *B01J 19/2485* (2013.01); *B01J 35/0033* (2013.01); *B01J 35/04* (2013.01); *C01B 3/40* (2013.01); *C01B 3/503* (2013.01); *B01D 53/047* (2013.01); *B01D 53/1475* (2013.01); *B01D 53/228* (2013.01); *B01D 2252/204* (2013.01); *B01J 2219/00135* (2013.01); *B01J 2219/00155* (2013.01); *B01J 2219/00186* (2013.01); *B01J 2219/0871* (2013.01); *B01J 2219/2407* (2013.01); *B01J 2219/2438* (2013.01); *B01J 2219/2445* (2013.01); *C01B 2203/0233* (2013.01); *C01B 2203/0283* (2013.01); *C01B 2203/0405* (2013.01); *C01B 2203/046* (2013.01); *C01B 2203/085* (2013.01); *C01B 2203/0883* (2013.01); *C01B 2203/1023* (2013.01); *C01B 2203/1264* (2013.01)

(58) Field of Classification Search
CPC ...... C01B 2203/0405; C01B 2203/046; C01B 2203/085; C01B 2203/0883; C01B 2203/1023; C01B 2203/1264; C01B 2203/1058; C01B 2203/141; C01B 3/506; B01D 53/265; B01D 53/047; B01D 53/1475; B01D 53/228; B01D 2252/204; B01J 19/0013; B01J 19/2485; B01J 35/0033; B01J 35/04; B01J 2219/00135; B01J 2219/00155; B01J 2219/00186; B01J 2219/0871; B01J 2219/2407; B01J 2219/2438; B01J 2219/2445; B01J 2219/2416; B01J 2219/2428; B01J 2219/2432; B01J 2219/2443; B01J 12/007; B01J 15/005; Y02P 20/52
See application file for complete search history.

(56) References Cited

U.S. PATENT DOCUMENTS

| | | | |
|---|---|---|---|
| 2002/0081253 | A1 | 6/2002 | Fumio |
| 2002/0108307 | A1 | 8/2002 | Lightner |
| 2002/0119084 | A1* | 8/2002 | Boneberg .................. C01B 3/38 422/600 |
| 2004/0063797 | A1* | 4/2004 | Aasberg-Petersen ....................... C01B 3/382 518/704 |
| 2004/0213732 | A1 | 10/2004 | Lightner |
| 2004/0265225 | A1 | 12/2004 | Watson et al. |
| 2006/0124445 | A1 | 6/2006 | Labrecque et al. |
| 2009/0035192 | A1 | 2/2009 | Hwang |
| 2009/0184293 | A1* | 7/2009 | Han ........ C01B 3/382 252/376 |
| 2011/0014088 | A1 | 1/2011 | Zubrin |
| 2011/0151341 | A1* | 6/2011 | Tatsui .................... B01J 8/0465 429/412 |
| 2013/0345326 | A1* | 12/2013 | Bashir ..................... C01B 3/384 252/373 |
| 2015/0336074 | A1 | 11/2015 | Tonkovich |

FOREIGN PATENT DOCUMENTS

| | | |
|---|---|---|
| KR | 20090068427 A | 6/2009 |
| WO | 2004091773 A1 | 10/2004 |

OTHER PUBLICATIONS

Search Report issued in corresponding Danish Patent Application No. PA 2018 00636, 9 pages (dated Feb. 8, 2019).

* cited by examiner

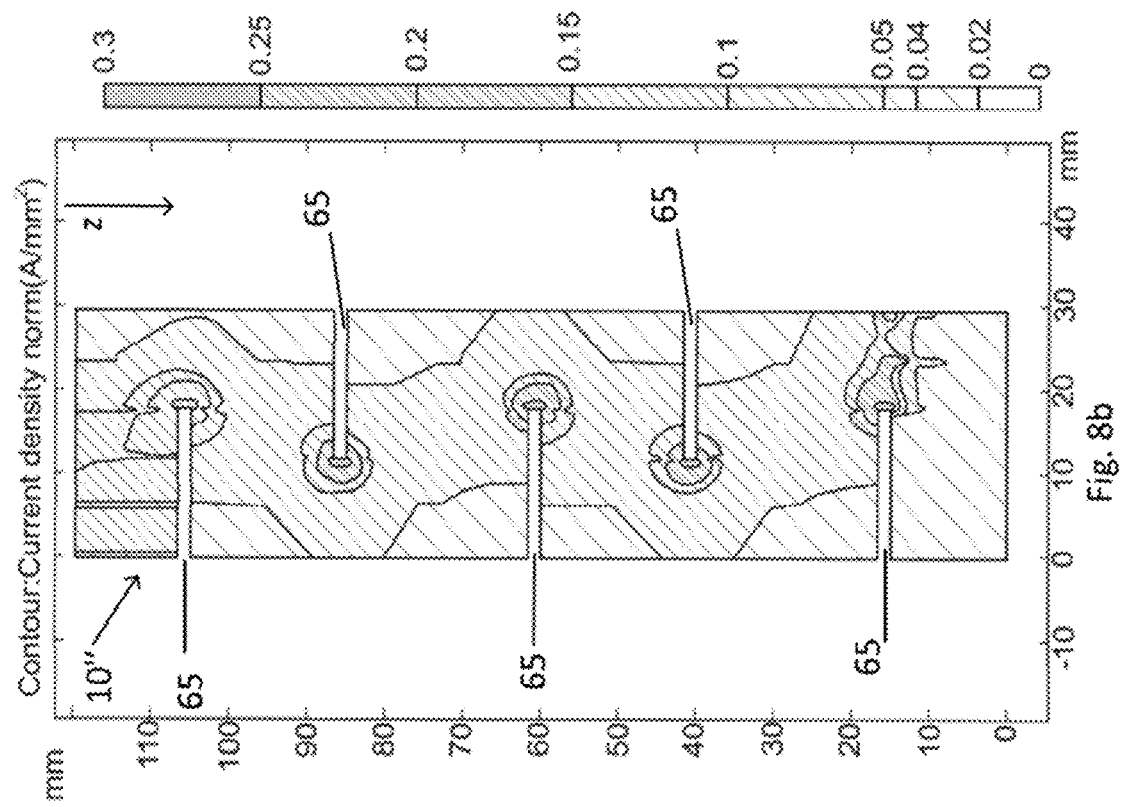
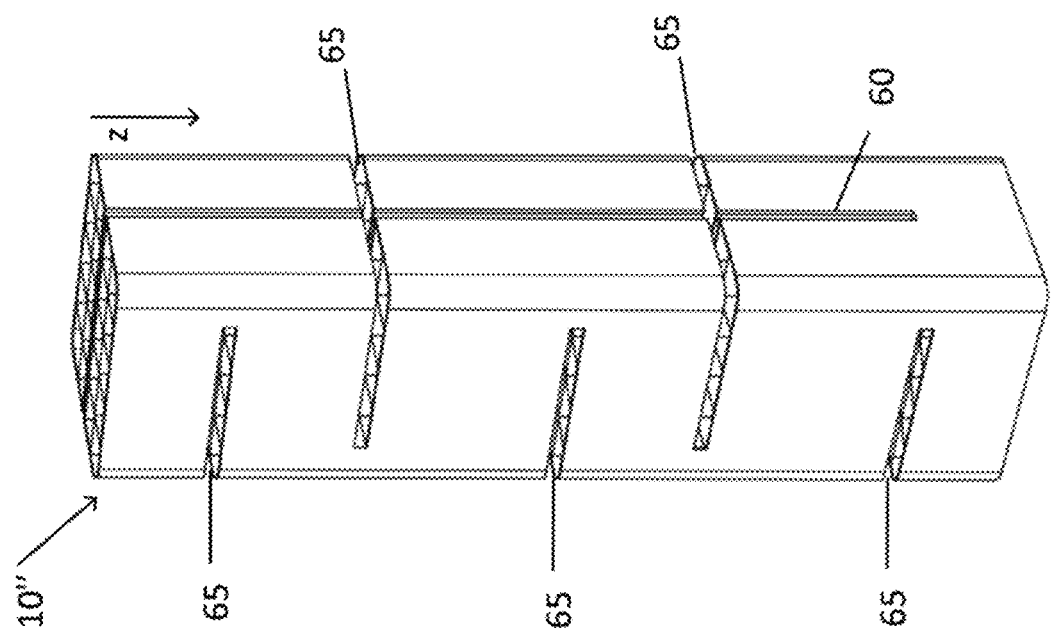
Fig. 8b
Fig. 8a

HYDROGEN PRODUCTION BY STEAM METHANE REFORMING

FIELD OF THE INVENTION

The present invention relates to a hydrogen plant and a process for producing hydrogen by steam methane reforming of a feed gas comprising hydrocarbons. The invention relates particularly to a hydrogen plant and a process for producing hydrogen, where the heat for the steam methane reforming is provided by resistance heating.

BACKGROUND

Steam reforming reactions will often be challenged by how efficient heat can be transferred to the reactive zone of the catalyst bed within a reactor unit. Conventional heat transfer by convection, conduction and/or radiation heating can be slow and will often meet large resistance in many configurations. This challenge can be illustrated with the tubular reformer in a steam reforming plant, which practically can be considered as a large heat exchanger with heat transfer as the rate limiting step. The temperature at the innermost part of the tubes of the tubular reformer is somewhat lower than the temperature outside the tubes due to the heat transfer rate through the walls of the tube and to the catalyst within the tubes as well as due to the endothermic nature of the steam reforming reaction.

One way to supply heat within catalyst instead of outside the tubes housing the catalyst is by means of electrical resistance heating. DE102013226126 describes a process for allothermal methane reforming with physical energy reclamation, wherein methane is reformed by means of carbon dioxide to synthesis gas consisting of carbon monoxide and hydrogen. The starting gases $CH_4$ and $CO_2$ are conducted in a fixed bed reactor consisting of electrically conductive and catalytic particles, which is electrically heated to temperatures of about 1000 K. The conversion of the reactant gases and the generation of heat of the generated synthesis gas take place in the fixed bed reactor.

It is an object of the invention to provide an alternative configuration of a plant for production of hydrogen.

It is also an object of the invention to provide a hydrogen plant with a reforming reactor system having integrated heat supply and catalysts.

It is a further object of the invention to provide a process for producing hydrogen by steam reforming wherein the overall energy consumption is reduced compared to a system with an externally heated reactor, such as a side fired or top fired steam methane reformer (SMR), which is the reference for industrial scale steam reforming. By utilizing electric heating, the high temperature flue gas of the fired SMR is avoided and less energy is therefore needed in the reforming section of the electrically heated reactor.

It is another object of the invention to provide a hydrogen plant and process for producing a hydrogen gas by steam reforming wherein the amount of catalyst and the size of the reforming reactor system of the hydrogen plant is reduced compared to an SMR. It is also an object of the invention to provide for the possibility of tailoring and thus reducing the amount of catalytically active material within a hydrogen plant, while maintaining a controlled reaction front of the steam reforming reaction.

It is also an object of the invention to provide a configuration of a plant and process for production of high pressure hydrogen where the requirements for compression downstream the steam methane reforming unit is reduced considerably.

Thus, it is an object of the invention to provide a process for production of hydrogen by use of a hydrogen plant, wherein the hydrogen gas output from the hydrogen plant has a relatively high temperature and a relatively high pressure. In particular, it is desirable if the temperature of the product gas from a reforming reactor system of the hydrogen plant is between about 900° C. and 1100° C. or even up to 1300° C., and if the pressure of the product gas output from a reforming reactor system of the hydrogen plant is between about 30 bar and about 200 bar. The invention will all for precise control of the temperature of a product gas output from the reforming reactor system.

An advantage of the invention is that the overall emission of carbon dioxide and other emissions detrimental to the climate may be reduced considerably, in particular if the power used in the reforming reactor system and possibly other units of the hydrogen plant is from renewable energy resources.

SUMMARY OF THE INVENTION

Embodiments of the invention generally relate to a hydrogen plant for producing hydrogen, where the hydrogen plant comprises a reforming reactor system comprising a first catalyst bed comprising an electrically conductive material and a catalytically active material, where the catalytically active material is arranged for catalyzing steam reforming of a feed gas comprising hydrocarbons, a pressure shell housing the first catalyst bed, a heat insulation layer between the first catalyst bed and the pressure shell, and at least two conductors electrically connected to the electrically conductive material and to an electrical power supply placed outside the pressure shell, wherein the electrical power supply is dimensioned to heat at least part of the first catalyst bed to a temperature of at least 500° C. by passing an electrical current through the electrically conductive material, wherein the pressure shell has a design pressure of between 5 and 200 bar, preferably between 30 and 200 bar, more preferably between 80 and 180 bar. The hydrogen plant further comprises a water gas shift unit downstream the reforming reactor system, and a gas separation unit downstream the water gas shift unit. In the cases where the pressure shell has a design pressure between 30 and 200 bar, such as between 80 and 180 bar, such as for example 30 bar, 50 bar, 800 bar, 100 bar, 120 bar or 150 bar, the hydrogen plant is arranged to produce high pressure hydrogen. The layout of the reforming reactor system of the hydrogen plant allows for feeding a pressurized feed gas to the reforming reactor system at an inlet and directing this gas into the pressure shell of the reforming reactor system. Inside the pressure shell, a configuration of heat insulation layers and inert material is arranged to direct the feed gas through first catalyst bed where it will be in contact catalytically active material supported, where the catalytically active material will facilitate a steam reforming reaction. The heating of the electrically conductive material will supply the required heat for the endothermic reaction. The product gas from the first catalyst bed is led to the reforming reactor system outlet and from there to a water gas shift unit and subsequently a gas separation unit. The gas separation unit is arranged to remove $CO_2$ from the product gas.

An important feature of the resistance heating process is thus that the energy is supplied inside the reforming reactor system, instead of being supplied from an external heat source via heat conduction, convection and radiation, e.g. through catalyst tubes. Moreover, the hottest part of the reforming reactor system will be within the pressure shell of the reforming reactor system. Preferably, the electrical power supply and the first catalyst bed are dimensioned so that at least part of the electrically conductive material reaches a temperature of 850° C., preferably 900° C., more preferably 1000° C. or even more preferably 1100° C.

The hydrogen plant of the invention may advantageously comprise one or more compressors and/or pumps upstream the reforming reactor system. The compressors/pumps are arranged to compress the feed gas to a pressure of between 5 and 200 bar, preferably between 30 and 200 bar upstream the reforming reactor system. The constituents of the feed, viz. steam, hydrogen and hydrocarbon feed gas, may be compressed individually and fed individually into the reforming reactor system. When the feed is pressurized upstream the reforming reactor system of the invention and the reforming reactor system comprises a pressure shell having a design pressure of between 5 and 200 bar, compression downstream of the reforming reactor system of the invention may be made simpler or avoided completely. For a hydrogen plant integrated in a refinery plant where the hydrogen product is used for hydrotreating, a hydrogen compressor to the hydrotreater may be avoided if the product gas from the reforming reactor system has an outlet pressure of about 150-200 bar.

In this context, the term "feed gas comprising hydrocarbons" is meant to denote a gas with one or more hydrocarbons and possibly other constituents. Thus, typically feed gas comprising hydrocarbons comprises a hydrocarbon gas, such as $CH_4$ and optionally also higher hydrocarbons in relatively small amounts, in addition to small amounts of other gasses. Higher hydrocarbons are components with two or more carbon atoms such as ethane and propane. Examples of "hydrocarbon gas" may be natural gas, town gas, naphtha or a mixture of methane and higher hydrocarbons. Hydrocarbons may also be components with other atoms than carbon and hydrogen such as oxygenates. The term "feed gas comprising hydrocarbons" is meant to denote a feed gas comprising a hydrocarbon gas with one or more hydrocarbons mixed with steam, hydrogen and possibly other constituents, such as carbon monoxide, carbon dioxide, and nitrogen and argon. Typically, the feed gas let into the reforming reactor system has a predetermined ratio of hydrocarbon gas, steam and hydrogen, and potentially also carbon dioxide.

Moreover, the term "steam reforming" is meant to denote a reforming reaction according to one or more of the following reactions:

$$CH_4+H_2O \leftrightarrow CO+3H_2 \quad (i)$$

$$CH_4+2H_2O \leftrightarrow CO_2+4H_2 \quad (ii)$$

$$CH_4+CO_2 \leftrightarrow 2CO+2H_2 \quad (iii)$$

Reactions (i) and (ii) are steam methane reforming reactions, whilst reaction (iii) is the dry methane reforming reaction.

For higher hydrocarbons, viz. $C_nH_m$, where n≥2, m≥4, equation (i) is generalized as:

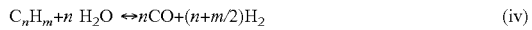

$$C_nH_m + n\,H_2O \leftrightarrow nCO+(n+m/2)H_2 \quad (iv)$$

where n≥2, m≥4.

Typically, steam reforming is accompanied by the water gas shift reaction (v):

$$CO+H_2O \leftrightarrow CO_2+H_2 \quad (v)$$

The term "steam methane reforming" is meant to cover the reactions (i) and (ii), the term "steam reforming" is meant to cover the reactions (i), (ii) and (iv), whilst the term "methanation" covers the reverse reaction of reaction (i). In most cases, all of these reactions (i)-(v) are at, or close to, equilibrium at the outlet from the reforming reactor system. The term "prereforming" is often used to cover the catalytic conversion of higher hydrocarbons according to reaction (iv). Prereforming is typically accompanied by steam reforming and/or methanation (depending upon the gas composition and operating conditions) and the water gas shift reaction. Prereforming is often carried out in adiabatic reactors but may also take place in heated reactors.

The steam reforming reaction is highly endothermic. High temperatures typically in excess of 800-850° C. are needed to reach acceptable conversions of the methane in the feed. A typical SMR consists of a number of tubes filled with catalyst pellets placed inside a furnace. The tubes are typically 10-13 meters long and will typically have an inner diameter between 80 and 160 mm. Burners placed in the furnace provide the required heat for the reactions by combustion of a fuel gas. A maximum average heat flux of 80000-90000 kcal/h/m² of inner tube surface is not uncommon. There is a general limitation to the obtainable heat flux due to mechanical constraints and the capacity is therefore increased by increasing the number of tubes and the furnace size. More details on the SMR type reforming reactor system can be found in the art, e.g. "Synthesis gas production for FT synthesis"; Chapter 4, p. 258-352, 2004. As used herein, the abbreviation "SMR" is meant to denote an externally fired tubular steam methane reformer ad described above.

Typically, the feed gas will have undergone desulfurization to remove sulfur therein and thereby avoid deactivation of the catalysts in the process, prior to being inlet into the reforming reactor system.

Optionally, the hydrocarbon gas will together with steam, and potentially also hydrogen and/or other components such as carbon dioxide, also have undergone prereforming according to reaction (iv) in a temperature range of ca. 350-550° C. to convert higher hydrocarbons as an initial step in the process, normally taking place downstream the desulfurization step. This removes the risk of carbon formation from higher hydrocarbons on catalyst in the subsequent process steps. Optionally, carbon dioxide or other components may also be mixed with the gas leaving the prereforming step to form the feed gas.

Typically, the feed gas entering into the reactor system has been preheated. However, due to the heat flux that can be provided by the structured catalyst, the feed gas entering the reactor system can be relatively cold. Thus, preheating the feed gas to a temperature between about 200 to about 450° C. may be sufficient.

The term "electrically conductive" is meant to denote materials with an electrical resistivity in the range from: $10^{-5}$ to $10^{-8}$ Ω·m at 20° C. Thus, materials that are electrically conductive are e.g. metals like copper, silver, aluminum, chromium, iron, nickel, or alloys of metals. Moreover, the term "electrically insulating" is meant to denote materials with an electrical resistivity above 10 Ω·m at 20° C., e.g. in the range from $10^9$ to $10^{25}$ Ω·m at 20° C.

The term "first catalyst bed" is to be construed broadly. Thus, the first catalyst bed may be a bed of catalyst particles, e.g. pellets, typically in the form of catalytically active material supported on a high area support. However, the term "first catalyst bed" is also meant to cover macroscopic structures coated with catalyst, e.g. in the form of catalytic monoliths.

The term "synthesis gas" is meant to denote a gas comprising hydrogen, carbon monoxide and possibly also carbon dioxide and small amounts of other gasses, such as argon, nitrogen, methane, etc.

When the reforming reactor system comprises a heat insulation layer between the first catalyst bed and the pressure shell, appropriate heat and electrical insulation between the first catalyst bed and the pressure shell is obtained. The presence of heat insulating layer between the pressure shell and the first catalyst bed assists in avoiding excessive heating of the pressure shell, and assists in reducing thermal losses to the surroundings. The temperatures of the first catalyst bed may reach up to about 1300° C., at least at some parts thereof, but by using the heat insulation layer between the first catalyst bed and the pressure shell the temperature of the pressure shell can be kept at significantly lower temperatures of say 500° C. or even 200° C., which is advantageous as typical construction steel materials typically are unsuitable for pressure bearing application at high temperatures, such as above 1000° C. Moreover, a heat insulating layer between the pressure shell and the first catalyst bed assists in control of the electrical current within the reforming reactor system, since heat insulation layer is also electrically insulating. The heat insulation layer could be one or more layers of solid material, such as ceramics, inert material, refractory material or a gas barrier or a combination thereof. Thus, it is also conceivable that a purge gas or a confined gas constitutes or forms part of the heat insulation layer.

As the hottest part of the reforming reactor system is the first catalyst bed, and in particular the electrically conductive material thereof, which will be surrounded by heat insulation layer and within the pressure shell of the reforming reactor system, the temperature of the pressure shell can be kept significantly lower than the maximum process temperature. This allows for having a relative low design temperature of the pressure shell of e.g. 700° C. or 500° C. or preferably 300° C. or 200° C. of the pressure shell whilst having maximum process temperatures of 900° C. or even 1100° C. or even up to 1300° C. Material strength is higher at the lower of these temperatures (corresponding to the design temperature of the pressure shell as indicated above) which means that in contrast to the externally heated steam methane reforming reactor, such as a top fired or side fired SMR, the current reforming reactor system can be designed for high(er) pressure operation. In a standard SMR the maximum tube wall temperature may be limited to ca. 1000° C. Another advantage is that the lower design temperature compared to a standard SMR means that in some cases the thickness of the pressure shell can be decreased, thus saving costs.

Moreover, it should be noted that the term "heat insulating material" is meant to denote materials having a thermal conductivity of about 10 W·m$^{-1}$·K$^{-1}$ or below. Examples of heat insulating materials are ceramics, refractory material, alumina based materials, zirconia based materials and similar.

In an embodiment, the first catalyst bed comprises a structured catalyst comprising a macroscopic structure of electrically conductive material, where the macroscopic structure supports a ceramic coating and the ceramic coating supports a catalytically active material.

Thus, during operating of the hydrogen plant, an electrical current is passed through the macroscopic structure and thereby heats the macroscopic structure and the catalytically active material supported thereon. The close proximity between the catalytically active material and the macroscopic structure enables efficient heating of the catalytically active material by solid material heat conduction from the resistance heated macroscopic structure. The amount and composition of the catalytically active material can be tailored to the steam reforming reaction at the given operating conditions. An important feature of the resistance heating process is thus that the energy is supplied inside the object itself, instead of being supplied from an external heat source via heat conduction, convection and radiation. Moreover, the hottest part of the reactor system will be within the pressure shell of the reactor system. Preferably, the electrical power supply and the electrically conductive material are dimensioned so that at least part of the electrically conductive material reaches a temperature of 850° C., preferably 900° C., more preferably 1000° C. or even more preferably 1100° C. The amount and composition of the catalytically active material can be tailored to the steam reforming reaction at the given operating conditions. The surface area of the electrically conductive material, the fraction of the electrically conductive material coated with a ceramic coating, the type and structure of the ceramic coating, and the amount and composition of the catalytically active catalyst material may be tailored to the steam reforming reaction at the given operating conditions. However, it should be noted, that advantageously substantially all the surface of the electrically conductive material is coated with the ceramic coating and preferably all or most of the ceramic coating supports the catalytically active material. Preferably, only the parts of the electrically conductive material, which are connected to conductors, are not provided with the ceramic coating. The ceramic coating supporting the catalytically active material reduces or prevents the risk of carbon formation according to the reaction:

$$CH_4 \rightleftharpoons C + 2H_2 \qquad (A)$$

The coverage of the electrically conductive material with the ceramic coating supporting the catalytically active material ensures that the metallic phase of the electrically conductive material is covered by a coherent oxide layer, which has less potential for carbon forming reactions. Furthermore, the catalytically active material of the oxide phase will catalyze the steam reforming reactions and bring the reactant gas towards, or even close to, thermodynamic equilibrium. This increases the partial pressure of hydrogen and decreases the partial pressure of methane thereby reducing or in many cases eliminating the thermodynamic potential for carbon formation according to reaction (A) above.

The surface area of the macroscopic structure, the fraction of the macroscopic structure coated with a ceramic coating, the type and structure of the ceramic coating, and the amount and composition of the catalytically active material may be tailored to the steam reforming reaction at the given operating conditions.

The physical dimensions of the macroscopic structure may be any appropriate dimensions; thus, the height may be smaller than the width of the macroscopic structure or vice versa.

In an embodiment, the structured catalyst within the reforming reactor system has a ratio between the area equivalent diameter of a horizontal cross section through the structured catalyst and the height of the structured catalyst in the range from 0.1 to 2.0. The area equivalent diameter of the cross section through the reforming reactor system is defined as the diameter of a circle of equivalent area as the area of the cross section. When the ratio between the area equivalent diameter and the height of the structured catalyst is between 0.1 and 2.0, the pressure shell housing the structured catalyst may be relatively small compared to current SMRs. Each reforming reactor system may process a larger amount of feed gas than is possible in one tube of an SMR. Hereby, the amount of outside piping to the reforming reactor system may be reduced compared to a current SMR, and thereby the cost of such piping is reduced. Typically, the gas flows through the reforming reactor system in an upflow or downflow direction, so that the gas flows through channels in the structured catalyst along the height thereof. When the structured catalyst comprises a number of or an array of macroscopic structures, the individual macroscopic structures within the array may be placed side by side, on top of each other or in a combination thereof. It is stressed, that when the structured catalyst comprises more than one macroscopic structures, the dimensions of the structured catalyst are the dimensions of the more than one macroscopic structures. Thus, as an example, if the overall structured catalyst comprises two macroscopic structures, each having the height h, put on top of each other, the height of the structured catalyst is 2 h.

The volume of the structured catalyst is chosen in consideration of the desired approach to equilibrium and/or temperature and/or hydrocarbons conversion and/or dry mole concentration of hydrocarbons in the product gas and/or temperature out of the reforming reactor system correlated to the heat generation capacity of the macroscopic structure and/or to ensure the dry mole concentration of hydrocarbons in the product gas lies in a predetermined range and/or to ensure the approach to equilibrium of the steam methane reforming reaction (reaction (i)) lies in a predetermined range.

In an embodiment, the height of the reforming reactor system is between 0.5 and 7 m, more preferably between 0.5 and 3 m. Exemplary values of the height of the reforming reactor system is a height of less than 5 meters, preferably less than 2 m or even 1 m. The reforming reactor system comprises the first catalyst bed, a pressure shell, a heat insulation layer as well as two conductors. The height of the reforming reactor system is therefore the distance from the bottom of the reforming reactor system to the top thereof, which typically is the distance from the bottom of the pressure shell to the top thereof; however, in case the conductors and/or piping to or from the pressure shell extend(s) from the bottom or top of the pressure shell, those parts may be considered as contributing to the height of the reforming reactor system. The dimensions of the reforming reactor system and of the structured catalyst within the reforming reactor system are correlated; of course, the pressure shell and heat insulation layer render the reforming reactor system somewhat larger than the structured catalyst itself. For comparison, industrial scale SMRs are typically constructed of catalyst tubes having a length of 10 m or above to maximize external surface area of the tubes. The present invention is advantageous in that such confinement in the design of the reforming reactor system are superfluous.

As used herein the term "reforming reactor system comprising a structured catalyst" is not meant to be limited to a reforming reactor system with a single macroscopic structure. Instead, the term is meant to cover both a structured catalyst with a macroscopic structure, ceramic coating and catalytically active material as well as an array of such macroscopic structures.

The term "macroscopic structure supporting a ceramic coating" is meant to denote that the macroscopic structure is coated by the ceramic coating at, at least, a part of the surface of the macroscopic structure. Thus, the term does not imply that all the surface of the macroscopic structure is coated by the ceramic coating; in particular, at least the parts of the macroscopic structure which are electrically connected to the conductors and thus to the electrical power supply do not have a coating thereon. The coating is a ceramic material with pores in the structure, which allows for supporting catalytically active material on and inside the coating. Advantageously, the catalytically active material comprises catalytically active particles having a size in the range from about 5 nm to about 250 nm.

As used herein, the term "macroscopic structure" is meant to denote a structure which is large enough to be visible with the naked eye, without magnifying devices. The dimensions of the macroscopic structure are typically in the range of centimeters or even meters. Dimensions of the macroscopic structure are advantageously made to correspond at least partly to the inner dimensions of the pressure shell housing the structured catalyst, saving room for the heat insulation layer and conductors. The dimensions of the macroscopic structure are typically in the range of tens of centimeters or of even meters. Two or more macroscopic structures may be connected in order to provide an array of macroscopic structures having at least one of the outer dimensions in the range of meters, such as 0.5 m, 1 m, 2 m or 5 m. Such two or more macroscopic structures may be denoted "an array of macroscopic structures".

Advantageously, any relevant gaps between structured catalyst, the heat insulation layer, the pressure shell, and/or any other components inside the reforming reactor system is filled with inert material, e.g. in the form of inert pellets. Such gaps are e.g. a gap between the lower side of the structured catalyst and the bottom of the pressure shell and a gap between the sides of the structured catalyst and the insulation layer covering the inner sides of the pressure shell. The inert material may e.g. be a ceramic material in the form of pellets or tiles. The inert material assists in controlling the gas distribution through the reforming reactor system and in controlling the flow of the gas through the structured catalyst. Moreover, the inert material typically has a heat insulating effect.

Another advantage of using a structured catalyst within the reforming reactor system is the gas flow through the structured catalyst may be upflow, due to the structured catalyst comprising a macroscopic structure. Alternatively, the flow through the structured catalyst could be in the horizontal direction or any other appropriate direction. This is more difficult in the case where the reactor contains pellets due to the risk of fluidization, grinding, and blowing out the pellets. Thereby, a substantial amount of piping may be avoided, thus reducing plant costs. Furthermore, the possibility of upflow or horizontal flow increases the flexibility in plant design.

As shown in the figures, the gas flow through the structured catalyst is axial or coaxial with the length or z-axis of the structured catalyst. Even though the figures show that the z-axis of the structured catalyst is vertical, it should be noted that the reactor can be positioned in any suitable way, so that the structured catalyst and the gas flow through it can e.g. be horizontal, upside down compared to the figures, or angled at e.g in 45° to horizontal.

In an embodiment, the pressure shell comprises an inlet for letting in a feed gas and an outlet for letting out product gas, wherein the inlet is positioned close to a first end of the pressure shell and the outlet is positioned close to a second end of the pressure shell, and wherein the at least two conductors both are connected to the structured catalyst at a position on the structured catalyst closer to the inlet than to the outlet. Hereby, the at least two conductors can be placed in the substantially colder part of the reforming reactor system as the inlet gas will have lower temperature than the product gas, the structures catalyst will be colder in the colder in the most upstream part of the structure due to the heat consumed by the progress of the chemical reaction, and the feed gas fed led through the inlet may cool the at least two conductors before being heated by the structured catalyst further along the path of the gas through the structured catalyst. It is an advantage that the temperature of all electrically conducting elements except the macroscopic structure is kept down in order to protect the connections between the conductors and the structured catalyst. When the temperature of the conductors and other electrically conducting elements, except the macroscopic structure, is relatively low, less limitations on materials suitable for the conductors and other electrically conducting elements, except the macroscopic structure, exists. When the temperature of the electrically conducting elements increase, the resistivity thereof increases; therefore, it is desirable to avoid unnecessary heating of all other parts than the macroscopic structures within the reforming reactor system. The term "electrically conducting elements, except the macroscopic structure" is meant to cover the relevant electrically conducting elements arranged to connect the power supply to the structured catalyst. In another embodiment, the two conductors of the reforming reactor system may be provided at different ends of the structured catalyst.

It should be noted, that the hydrogen plant of the invention may include any appropriate number of power supplies and any appropriate number of conductors connecting the power supply/supplies and the macroscopic structure(s) of the structured catalyst.

In an embodiment the structured catalyst comprises a first part arranged to generate a first heat flux and a second part arranged to generate a second heat flux, where the first heat flux is lower than the second heat flux, and where the first part is upstream the second part. Here, the term "the first part is upstream the second part" is meant to denote, that the gas fed into the reforming reactor system reaches the first part before the gas reaches the second part. The first part and second part of the structured catalyst may be two different macroscopic structures supporting ceramic coating supporting catalytically active material, where the two different macroscopic structures may be arranged to generate different heat fluxes for a given electrical current and voltage. For instance, the first part of the structured catalyst may have a large surface area, whilst the second part of the structured catalyst has a smaller surface area. This may be accomplished by providing a structured catalyst in the second part having a smaller cross sectional area than the cross sectional area of the first part. Alternatively, the current path through the first part of the structured catalyst may be more straight than the current path through the second part of the structured catalyst, thus making the current twist and wind more through the second part than through the first part of the structured catalyst, whereby the current generates more heat in the second part of the structured catalyst than in the first part. Slits or cuts in the macroscopic structure may make the current path zigzag through the macroscopic structure. It should be noted, that the first and second part of the structured catalyst may experience different electrical currents and voltages in order to be able to supply different heat fluxes. However, the different heat fluxes of the first and second part may also be achieved by supplying the same electrical current and voltage through/over the first and second part, due to different physical properties of the first and second part as indicated above.

In an embodiment, the structured catalyst has electrically insulating parts arranged to increase the current path between the conductors to a length larger than the largest dimension of the structured catalyst. The provision of a current path between the conductors larger than the largest dimension of the structured catalyst may be by provicion of electrically insulating parts positioned between the conductors and preventing the current running through some part of the structured catalyst. Such electrically insulating parts are arranged to increase the current path and thus increase the resistance through the structured catalyst. In an embodiment, the at least one electrically insulating part has a length arranged to ensure that the minimum current path between the conductors is larger than the largest dimension of the macroscopic structure.

Non-limiting examples of such insulating parts are cuts, slits, or holes in the structure. Optionally, a solid insulating material such as ceramics in cuts or slits in the structure can be used. In a case where the solid insulating material is a porous ceramic material, the catalytically active material may advantageously be incorporated in the pores, by e.g. impregnation. A solid insulating material within a cut or slit assists in keeping the parts of the structured catalyst on the sides of the cut or slit from each other. As used herein, the term "largest dimension of the structured catalyst" is meant to denote the largest inner dimension of the geometrical form taken up by the structured catalyst. If the structured catalyst is box-formed, the largest dimension would be the diagonal from one corner to the farthest corner, also denoted the space diagonal.

It should be noted that even though the current through the structured catalyst may be arranged to twist or wind its way through the structured catalyst due to the electrically insulating parts arranged to increase the current path, the gas passing through the reforming reactor system is inlet at one end of the reforming reactor system, passes through the structured catalyst once before being outlet from the reforming reactor system. Inert material is advantageously present in relevant gaps between the structured catalyst and the rest of the reforming reactor system to ensure that the gas within the reforming reactor system passes through the structured catalyst and the catalytically active material supported thereby.

In an embodiment, the length of the gas passage through the structured catalyst is less than the length of the passage of current from one conductor through the structured catalyst and to the next conductor. The ratio of the length of the gas passage to the length of the current passage may be less than 0.6, or 0.3, 0.1, or even down to 0.002.

In an embodiment, the structured catalyst has electrically insulating parts arranged to make the current path through the structured catalyst a zigzag path. Here, the terms "zigzag path" and "zigzag route" is meant to denote a path that has corners at variable angles tracing a path from one conductor to another. A zigzag path is for example a path going upwards, turning, and subsequently going downwards. A zigzag path may have many turns, going upwards and subsequently downwards many times through the structured catalyst, even though one turn is enough to make the path a zigzag path.

It should be noted that the insulating parts arranged to increase the current path are not necessarily related to the ceramic coating on the macroscopic structure; even though this ceramic coating is also considered electrically insulating, it does not change the length of the current path between the conductors connected to the macroscopic structure.

A ceramic coating, with or without catalytically active material, may be added directly to a metal surface by wash coating. The wash coating of a metal surface is a wellknown process; a description is given in e.g. Cybulski, A., and Moulijn, J. A., Structured catalysts and reactors, Marcel Dekker, Inc, New York, 1998, Chapter 3, and references herein. The ceramic coating may be added to the surface of the macroscopic structure and subsequently the catalytically active material may be added; alternatively, the ceramic coat comprising the catalytically active material is added to the macroscopic structure.

In an embodiment, the first catalyst bed comprises an array of macroscopic structures. Thus, two or more macroscopic structures may be connected in order to provide an array of macroscopic structures having at least one of the outer dimensions in the range of meters, such as 2 m or 5 m. Such two or more macroscopic structures may be denoted "an array of macroscopic structures". In this case, the dimensions of an array of macroscopic structures are advantageously made to correspond at least partly to the inner dimension of the pressure shell housing the structured catalyst (saving room for the heat insulation layer). A conceivable array of macroscopic structures could take up a volume of 0.1 to 10 m$^3$ or even larger. A "structured catalyst" may comprise a single macroscopic structure or an array of macroscopic structures, where the macroscopic structure(s) support(s) a ceramic coating supporting catalytically active material.

In an embodiment, the macroscopic structures in an array of macroscopic structures may be electrically connected to each other. The connection between the two or more macroscopic structures may be by mechanical connection, clamping, soldering, welding or any combination of these connection methods. Each macroscopic structure may comprise terminals in order to facilitate the electrical connections. The two or more macroscopic structures may be connected to the power supply in serial or parallel connection. The electrical connection between the two or more macroscopic structures is advantageously coherent and uniform along the connection surface between the two or more macroscopic structures, so that the two or more macroscopic structures act as a single coherent or consistently intraconnected material; hereby, uniform electrical conductivity throughout the two or more macroscopic structures is facilitated. Alternatively, or additionally, the structured catalyst may comprise an array of macroscopic structures that are not electrically connected to each other. Instead, two or more macroscopic structures are placed together within the pressure shell, but not connected electrically to each other. In this case, the structured catalyst thus comprises macroscopic structures connected in parallel to the power supply.

In an embodiment, the macroscopic structure(s) has/have a plurality of parallel channels, a plurality of non-parallel channels and/or a plurality of labyrinthic channels. The channels have walls defining the channels. Several different forms and shapes of the macroscopic structure can be used as long as the surface area of the structured catalyst exposed to the gas is as large as possible. In a preferred embodiment, the macroscopic structure has parallel channels, since such parallel channels render a structured catalyst with a very small pressure drop. In a preferred embodiment, parallel longitudinal channels are skewed in the longitudinal direction of the macroscopic structure. In this way, molecules of the gas flowing through the macroscopic structure will mostly tend to hit a wall inside the channels instead of just flowing straight through a channel without necessarily getting into contact with a wall. The dimension of the channels should be appropriate in order to provide a macroscopic structure with a sufficient resistivity. For example, the channels could be quadratic (as seen in cross section perpendicular to the channels) and have a side length of the squares of between 1 and 3 mm; however, channels having a maximum extent in the cross section of up to about 4 cm are conceivable. Moreover, the thickness of the walls should be small enough to provide a relatively large electrical resistance and large enough to provide sufficient mechanical strength. The walls may e.g. have a thickness of between 0.2 and 2 mm, such as about 0.5 mm, and the ceramic coating supported by the walls has a thickness of between 10 μm and 500 μm, such as between 50 μm and 200 μm, such as 100 μm. In another embodiment, the macroscopic structure of the structured catalyst is cross-corrugated. In general, when the macroscopic structure has parallel channels, the pressure drop from the inlet to the outlet of the reforming reactor system may be reduced considerably compared to a reactor where the catalyst material is in the form of pellets such as a standard SMR.

In an embodiment, the macroscopic structure(s) is/are extruded and sintered structures. Alternatively, the macroscopic structure(s) is/are 3D printed structure(s). A 3D printed structure can be provided with or without subsequent sintering. Extruding or 3D printing a macroscopic structure, and optional subsequent sintering thereof results in a uniformly and coherently shaped macroscopic structure, which can afterwards be coated with the ceramic coating.

Preferably, the macroscopic structure has been manufactured by 3D printing or extrusion of a mixture of powdered metallic particles and a binder to an extruded structure and subsequent sintering of the extruded structure, thereby providing a material with a high geometric surface area per volume. Preferably, the 3D printed extruded structure is sintered in a reducing atmosphere to provide the macroscopic structure. Alternatively, the macroscopic structure is 3D printed a metal additive manufacturing melting process, viz. a 3D printing processes, which do not require subsequent sintering, such as powder bed fusion or direct energy deposition processes. Examples of such powder bed fusion or direct energy deposition processes are laser beam, electron beam or plasma 3D printing processes. As another alternative, the macroscopic structure may have been manufactured as a 3D metal structure by means of a binderbased metal additive manufacturing process, and subsequent sintered in a non-oxidizing atmosphere at a first temperature $T_1$, where $T_1 > 1000°$ C., in order to provide the macroscopic structure.

A ceramic coating, which may contain the catalytically active material, is provided onto the macroscopic structure before a second sintering in an oxidizing atmosphere, in order to form chemical bonds between the ceramic coating and the macroscopic structure. Alternatively, the catalytically active material may be impregnated onto the ceramic coating after the second sintering. When chemical bonds are formed between the ceramic coating and the macroscopic structure, an especially high heat conductivity between the electrically heated macroscopic structure and the catalytically active material supported by the ceramic coating is possible, offering close and nearly direct contact between the heat source and the catalytically active material of the structured catalyst. Due to close proximity between the heat source and the catalytically active material, the heat transfer is effective, so that the structured catalyst can be very efficiently heated. A compact reforming reactor system in terms of gas processing per reforming reactor system volume is thus possible, and therefore the reforming reactor system housing the structured catalyst may be compact. The reforming reactor system of the invention does not need a furnace and this reduces the overall reactor size considerably. Moreover, it is an advantage that the amount of synthesis gas produced in a single pressure shell is increased considerably compared to known tubular steam reformers. In a standard tubular steam reformer, the amount of synthesis gas produced in a single tube of the tubular steam reformer is up to 500 Nm$^3$/h. In comparison, the reactor system of the invention is arranged to produce up to or more than 2000 Nm$^3$/h, e.g. even up to or more than 10000 Nm$^3$/h, within a single pressure shell. This can be done without the presence of O$_2$ in the feed gas and with less than 10% methane in the synthesis gas produced. When a single pressure shell houses catalyst for producing up to 10000 Nm$^3$/h synthesis gas, it is no longer necessary to provide a plurality of pressure shells or means for distributing feed gas to a plurality of such separate pressure shells.

As used herein, the terms "3D print" and "3D printing" is meant to denote a metal additive manufacturing process. Such metal additive manufacturing processes cover 3D printing processes in which material is joined to a structure under computer control to create a three-dimensional object, where the structure is to be solidified, e.g. by sintering, to provide the macroscopic structure. Moreover, such metal additive manufacturing processes cover 3D printing processes, which do not require subsequent sintering, such as powder bed fusion or direct energy deposition processes. Examples of such powder bed fusion or direct energy deposition processes are laser beam, electron beam or plasma 3D printing processes.

Preferably, the macroscopic structure comprises Fe, Cr, Al or an alloy thereof. Such an alloy may comprise further elements, such as Si, Mn, Y, Zr, C, Co or combinations thereof. Preferably, the catalytically active material is particles having a size from 5 nm to 250 nm. The catalytically active material may e.g. comprise nickel, ruthenium, rhodium, iridium, platinum, cobalt, or a combination thereof. Thus, one possible catalytically active material is a combination of nickel and rhodium and another combination of nickel and iridium. The ceramic coating may for example be an oxide comprising Al, Zr, Mg, Ce and/or Ca. Exemplary coatings are calcium aluminate or a magnesium aluminum spinel. Such a ceramic coating may comprise further elements, such as La, Y, Ti, K or combinations thereof. Preferably, the conductors are made of different materials than the macroscopic structure. The conductors may for example be of iron, nickel, aluminum, copper, silver or an alloy thereof. The ceramic coating is an electrically insulating material and will typically have a thickness in the range of around 100 μm, e.g. about 10-500 μm.

The macroscopic structure is advantageously a coherent or consistently intra-connected material in order to achieve electrical conductivity throughout the macroscopic structure, and thereby achieve thermal conductivity throughout the structured catalyst and in particular providing heating of the a catalytically active material supported by the macroscopic structure. By the coherent or consistently intra-connected material it is possible to ensure uniform distribution of current within the macroscopic structure and thus uniform distribution of heat within the structured catalyst. Throughout this text, the term "coherent" is meant to be synonymous to cohesive and thus refer to a material that is consistently intra-connected or consistently coupled. The effect of the structured catalyst being a coherent or consistently intra-connected material is that a control over the connectivity within the material of the structured catalyst and thus the conductivity of the macroscopic structure is obtained. It is to be noted that even if further modifications of the macroscopic structure are carried out, such as provision of slits within parts of the macroscopic structure or the implementation of insulating material within the macroscopic structure, the macroscopic structure is still denoted a coherent or consistently intra-connected material.

In an embodiment, the resistivity of the macroscopic structure is between 10$^{-5}$ Ω·m and 10$^{-7}$ Ω·m. A material with a resistivity within this range provides for an efficient heating of the structured catalyst when energized with a power source. Graphite has a resistivity of about 10$^{-5}$ Ω·m at 20° C., kanthal has a resistivity of about 10$^{-6}$ Ω·m at 20° C., whilst stainless steel has a resistivity of about 10$^{-7}$ Ω·m at 20° C. Kanthal is the trademark for a family of iron-chromium-aluminum (FeCrAl) alloys. The macroscopic structure may for example be made of FeCrAlloy having a resistivity of ca. 1.5·10$^{-6}$ Ω·m at 20° C.

In an embodiment, the material of the macroscopic structure is chosen as a material arranged to supply a heat flux of 500 W/m$^2$ to 50000 W/m$^2$ by resistance heating. Preferably, resistance heating of the material supplies a heat flux of between 5 kW/m$^2$ and 12 kW/m$^2$, for example between 8 kW/m$^2$ and 10 kW/m$^2$. The heat flux is given as heat per geometric surface area of the surface exposed to the gas. In an embodiment, the geometric surface area of the macroscopic structure is between 100 and 3000 m$^2$/m$^3$, such as between 500 and 1100 m$^2$/m$^3$. The heat flux from the material is advantageously chosen to match the reactivity of the catalytically active material. It is understood, that the heat flux is created by the current running through the electrically conductive material. The combination of geometry and the choice of material as well as the current and voltage of the current through the macroscopic structure determines the heat supplied by the macroscopic structure.

In an embodiment, the connection between the structured catalyst and the at least two conductors is a mechanical connection, a welded connection, a brazed connection or a combination thereof. The structured catalyst may comprise terminals physically and electrically connected to the structured catalyst in order to facilitate the electrical connection between the macroscopic structure of the structured catalyst and the at least two conductors. The term "mechanical connection" is meant to denote a connection where two components are held together mechanically, such as by a threaded connection or by clamping, so that a current may run between the components.

In an embodiment, the feed gas comprising hydrocarbon enters into the structured catalyst at a first end and wherein a product gas exits the structured catalyst at a second end, and the at least two conductors are connected to the structured catalyst at a position closer to the first end than to the second end.

The term "the first end of the structured catalyst" is meant to denote the end of the structured catalyst where the feed gas enters the structured catalyst, and the term "second end of the structured catalyst" is meant to denote the end of the structured catalyst from which the gas exits the structured catalyst. Moreover, it should be noted that the term "the at least two conductors are connected to the structured catalyst at a position on the structured catalyst closer to the first end of the structured catalyst than to the second end of the structured catalyst" is meant to denote that both/all of the at least two conductors are connected closer to the first end of the structured catalyst than to the second end. Preferably, the at least two conductors are connected to first end of the structured catalyst or within the quarter of the length of the/a macroscopic structure closest to the first end.

When the pressure shell comprises an inlet for letting in a feed gas and an outlet for letting out product gas, where the inlet is positioned so that the feed gas enters the structured catalyst in a first end of the structured catalyst and the product gas exits the structured catalyst from a second end of the structured catalyst, and when the at least two conductors both are connected to the structured catalyst at a position on the structured catalyst closer to the inlet than to the outlet, the at least two conductors can be placed in the relatively colder part of the reactor system. The first end of the structured catalyst has a lower temperature than the second end of the structured catalyst due to:

the feed gas fed led through the inlet may cool the at least two conductors before being heated by the structured catalyst further along the path of the gas through the structured catalyst;

the inlet feed gas inlet into the first end of the structured catalyst will have lower temperature than the product gas leaving the second end of the structured catalyst, due to the heat supplied to the structured catalyst electrically, the endothermic nature of the steam reforming reaction absorbs heat, the structured catalyst is constructed to direct an electrical current to run from one conductor substantially to the second end of the structured catalyst and re-turn to a second of the at least two conductors.

Therefore, the temperature profile in of the structured catalyst will correspond to a substantially continuously increasing temperature along the path of the feed gas through the structured catalyst. This corresponds to a substantially increasing conversion rate of methane in the feed gas to hydrogen and carbon monoxide.

Hereby, the current is led into the macroscopic structure and out from the macroscopic structure through electrodes positioned in the relatively cold first end thereof. It is an advantage that the temperature of all electrically conducting elements except the macroscopic structure is kept down in order to protect the connections between the conductors and the structured catalyst. When the temperature of the conductors and other electrically conducting elements, except the macroscopic structure, is relatively low, less limitations on materials suitable for the conductors and other electrically conducting elements, except the macroscopic structure, exists. When the temperature of the electrically conducting elements increase, the resistivity thereof increases; therefore, it is desirable to avoid unnecessary heating of all other parts than the macroscopic structures within the reactor system.

It should be noted that the term "electrically conducting elements, except the macroscopic structure" is meant to cover the relevant electrically conducting elements arranged to connect the power supply to the structured catalyst and potential connections in between macroscopic structures or structured catalyst.

The combination of the substantially continuously increasing temperature profile of the structured catalyst along the path of the feed gas through the structured catalyst and a controllable heat flux from the structured catalyst, control of the reaction front of the chemical reaction is achievable.

In an embodiment, the structured catalyst is constructed to direct an electrical current to run from one conductor substantially to the second end of the structured catalyst and return to a second of the at least two conductors.

In an embodiment of the reactor system, the structured catalyst has electrically insulating parts arranged to increase the length of a principal current path between the at least two conductors to a length larger than the largest dimension of the structured catalyst. Such electrically insulating parts are arranged to increase the current path and thus increase the resistance through the structured catalyst. Hereby, the current path through the structured catalyst can be e.g. more than 50%, 100%, 200%, 1000% or even 10000% longer than the largest dimension of the structured catalyst. As elucidated above, this assists in ensuring that the temperature profile of the structured catalyst will correspond to a substantially continuously increasing temperature along the path of a feed gas through the structured catalyst.

Moreover, such electrically insulating parts are arranged to direct the current from one conductor, which is closer to the first end of the structured catalyst than to the second end, towards the second end of the structured catalyst and back to a second conductor closer to the first end of the structured catalyst than to the second end. Preferably, the current is arranged to run from the first end of the structured catalyst to the second and back to the first end. As seen in the figures, the first end of the structured catalyst is the top end thereof. The arrow indicated "z" in FIGS. 2a, 2b, 3, 6, 7a and 7b indicates a z-axis along the length of the structured catalyst. The principal current path throughout the structured catalyst will have a positive or negative value of z-coordinate of the accompanied current density vector along most of the length of the current path. By principal current path is meant the path of the electrons through a macroscopic structure of the structured catalyst with the highest current density. The principal current path can also be understood as the path having the minimum length through the macroscopic structure of the structured catalyst. Seen geometrically, the principal current path can be quantified as the largest current density vector within a plane perpendicular to the gas flow direction of a coherent section of the macroscopic structure. At the bottom of the structured catalyst, as shown in the figures, the current will turn, and here the z-coordinate of the accompanied current density vector will be zero.

As used herein, the term coherent section is meant to denote a cross-section area of the macroscopic structure wherein all walls of the coherent section are geometrically connected to one or more other walls of the coherent section within the same plane.

In an embodiment of the reactor system, the structured catalyst has electrically insulating parts arranged to direct a current through the structured catalyst in order to ensure that for at least 70% of the length of the structured catalyst, a current density vector of the a principal current path has a non-zero component value parallel to the length of the structured catalyst. Thus, for at least 70% of the length of the structured catalyst, the current density vector will have a positive or negative component value parallel to the length of the structured catalyst. Thus, for at least 70%, e.g. for 90% or 95%, of the length of structured catalyst, viz. along the z-axis of the structured catalyst as seen in FIG. 1-5 or 6a, the current density vector of a principal current path will have a positive or negative value along the z-axis. This means that the current is forced from the first end of the structured catalyst towards the second end, and subsequently is forced towards the first end again. The temperature of the gas entering the first end of the structured catalyst and the endothermic steam reforming reaction taking place over the structured catalyst absorbs heat from the structured catalyst.

For this reason, the first end of the structured catalyst remains colder than the second end, and by encuring that the current density vector of the principal current path has a non-zero component value parallel to the length of the structured catalyst, this takes place with a substantially continuously increasing temperature profile, which gives a controllable reaction front. In an embodiment, the current density vector has a non-zero component value parallel to the length of the structured catalyst in 70% of the length of the structured catalyst, preferably 80%, more preferably 90%, and even more preferably 95%. It should be noted that the term "the length of the structured catalyst" is meant to denote the dimension of the structured catalyst in the direction of the gas flow in the reactor unit housing the structured catalyst. In the structured catalysts as shown in the figures, the length is the longitudinal direction, viz. the longest dimension thereof. This is indicated by the arrow denote z in some of the figures.

According to an embodiment of the reforming reactor system, each of the at least two conductors are led through a pressure shell in a fitting so that the at least two conductors are electrically insulated from the pressure shell. The fitting may be, partly, of a plastic and/or ceramic material. The term "fitting" is meant to denote a device that allows for mechanically connecting two pieces of hardware in a pressure bearing configuration. Thereby, the pressure within the pressure shell may be maintained even though the at least two conductors are lead through it. Non-limiting examples of the fittings may be an electrically insulating fitting, a dielectric fitting, a power comprescion seal, a compression fitting or a flange. The pressure shell typically comprises side walls, end walls, flanges and possibly further parts. The term "pressure shell" is meant to cover any of these components.

In the case, where the first catalyst bed comprises a structured catalyst, the fittings are positioned in connection with the first end thereof. For example, the fittings are positioned upstream the first end of the macroscopic structure as seen in the direction of the feed gas. In the case, where the first catalyst bed does not comprise a structured catalyst, the fittings are preferably positioned in an upper end of the first catalyst bed as seen from the feed gas direction. Hereby, the temperature of the fittings themselves will be kept relatively cold. The combination of heat insulation and the fittings in the relatively cold end of the pressure shell renders it possible to provide a pressure within the pressure shell of more than 5 bar, despite of the fittings through the walls of the pressure shell and despite the fact that the maximum temperature of the structured catalyst may reach about 950° C. If the fittings were not kept relatively cold, there would be a risk of mechanical errors such as deformations, and a leakage of gas from the pressure shell would be probable. Moreover, electrical connection between the at least two conductors and the pressure shell should be avoided. To this end, it is important to avoid excessive temperatures of the fitting. As an example, the fitting may comprise a polymer as well as a compression fitting.

In an embodiment, the pressure shell further comprises one or more inlets close to or in combination with at least one of the fittings in order to allow a cooling gas to flow over, around, close to or inside at least one conductor within the pressure shell. Hereby, the conductors are cooled and thus the temperature that the fitting experiences is kept down. If the cooling gas is not used, the conductors may be heated by the feed gas to the reforming reactor system, resistance heating of conductor due to the applied current, and/or heat conduction from the structured catalyst. The cooling gas could e.g. be hydrogen, nitrogen, steam, carbon dioxide or mixtures thereof. The temperature of the cooling gas at entry into the pressure shell may be e.g. about 100° C. or 200° C. or 250° C. In an embodiment, the conductor(s) is (are) hollow so that the cooling gas may flow through the conductor(s) and cool it (them) from within. By keeping the temperature of the fitting low, e.g. at around 100-200° C., it is easier to have a leak tight configuration. In an embodiment, a part of the feed gas, such as carbon dioxide and/or steam, is fed to the pressure shell as the cooling gas. In another embodiment, part of the feed gas or a gas with the same composition as the feed gas is used as cooling gas. It is noticed, that the feed gas could have a high inlet temperature and therefore have a heating effect on at least a part of the conductor, but in this case the feed gas would still force a gas flow away from the fittings and therefore ensure that a hotter gas, as the product gas, does not come in contact with the fitting.

In an embodiment, the electrically conductive material of the first catalyst bed comprises a resistor embedded in a catalyst material. This embedded resistor can be in any appropriate form of plates, spirals, rods, or similar, where catalyst pellets with the catalytically active material are positioned to surround, or in another way be in close contact to, the embedded resistor. Again, the hydrogen plant of the invention may include any appropriate number of power supplies and any appropriate number of conductors connecting the power supply/supplies and the electrically conductive material, viz. the embedded resistor. The catalyst material may be catalyst pellets, extrudates or granulates comprising a support material and catalytically active material. The catalyst material may comprise an appropriate combination of catalyst support and catalytically active material or catalytically active phase to facilitate the endothermic reaction.

In an embodiment, the embedded resistor supports a ceramic coating, wherein the ceramic coating supports a catalytically active material. Thus, the embedded resistor may, similar to the macroscopic support, be coated with a ceramic coating to directly support a catalytically active phase while still being embedded in the catalyst material. In this embodiment, the catalyst material surrounds the embedded resistor and the first catalyst bed comprises catalyst pellets, extrudates or granulates with catalytically active material.

In an embodiment, the reforming reactor system further comprises a second bed of a second catalyst material upstream the first catalyst bed and within the pressure shell. Here, the term "upstream" is seen from the flow direction of the feed gas. Thus, the term "upstream" is here meant to denote that the feed gas is directed through the bed of second catalyst material prior to reaching the first catalyst bed. This provides for a situation where the second catalyst material can be arranged for prereforming the feed gas (according to reaction (iv) above), so that the reforming reactor system provides prereforming and steam reforming within one pressure shell. This can also provide a situation where the hydrocarbons in the feed gas react with steam and/or $CO_2$ over the second catalyst material (such as according to reactions (i)-(v) above) and that the process gas to the first catalyst bed then has a lower content of hydrocarbons than the feed gas to the second catalyst material. The second catalyst can alternatively or additionally be a catalyst arranged for also capturing sulfur compounds in the feed gas. No specific heating needs to be provided to the bed of second catalyst material; however, the bed of second catalyst material may be heated indirectly if it is in close proximity to the structured catalyst. Alternatively, the second catalyst material may be heated. It is noted, that the second bed of second catalyst material and the first catalyst bed are both housed within the pressure shell.

In an embodiment, where the first catalyst bed comprises a structured catalyst, the reforming reactor system further comprises a third catalyst material in the form of catalyst pellets, extrudates or granulates loaded into the channels of the structured catalyst. In this embodiment, the reforming reactor system will thus have a catalytically active material in the coating of the macroscopic structure as well as a third catalyst material in the form catalyst pellets, extrudates or granulates within the channels of the structured catalyst. This allows for boosting the catalytic reactivity within the channels, or segments of these, of the structured catalyst. In order to clarify the terminology used here, it is noted that the term "structured catalyst" may also be denoted "a first catalyst material" to distinguish it from the second and/or third and/or fourth catalyst material.

The pellets are e.g. prepared in dimensions so as to loosely match the size of channels to form a single string of pellets stacked upon each other within a channel of the macroscopic structure. Alternatively, the pellets, extrudates or granulates may be prepared in a dimension significantly smaller than the channel size to form a packed bed inside each channel. As used herein, the term "pellet" is meant to denote any well-defined structure having a maximum outer dimension in the range of millimeters or centimeters, while "extrudate" and "granulate" are meant to define a catalyst material with a maximum outer dimension defined within a range.

In an embodiment a bed of fourth catalyst material is placed within the pressure shell and downstream the structured catalyst. Such fourth catalyst material may be in the form of catalyst pellets, extrudates or granulates. Hereby, the fourth catalyst material can be arranged for lowering the approach to equilibrium of the gas leaving the structured catalyst by making a pseudo adiabatic equilibration of the steam reforming reaction.

In an embodiment the second, third, and fourth catalyst material are catalyst materials suitable for the steam reforming reaction, the prereforming reaction, or the water gas shift reaction. Examples of relevant such catalysts are $Ni/MgAl_2O_4$, $Ni/CaAl_2O_4$, $Ni/Al_2O_4$, $Fe_2O_3/Cr_2O_3/MgO$, and $Cu/Zn/Al_2O_3$. In a configuration where a combination of the second, third, and fourth catalyst material is included in the reforming reactor system, the catalyst of each catalyst material can be different.

In an embodiment, the catalyst material of the first catalyst bed is a steam reforming catalyst. Examples of steam reforming catalysts are $Ni/MgAl_2O_4$, $Ni/Al_2O_3$, $Ni/CaAl_2O_4$, $Ru/MgAl_2O_4$, $Rh/MgAl_2O_4$, $Ir/MgAl_2O_4$, $Mo_2C$, $Wo_2C$, $CeO_2$, a noble metal on an $Al_2O_3$ carrier, but other catalysts suitable for reforming are also conceivable.

In an embodiment, the gas separation unit comprises one or more of the following units: a flash separation unit, a $CO_2$ wash unit, a pressure swing adsorption unit, a membrane, and/or a cryogenic separation unit. By flash separation is meant a phase separation unit, where a stream is divided into a liquid and gas phase close to or at the thermodynamic phase equilibrium at a given temperature.

By $CO_2$ wash is meant a unit utilizing a process, such as chemical absorption, for removing $CO_2$ from the process gas. In chemical absorption, the $CO_2$ containing gas is passed over a solvent which reacts with $CO_2$ and in this way binds it. The majority of the chemical solvents are amines, classified as primary amines as monoethanolamine (MEA) and digylcolamine (DGA), secondary amines as diethanolamine (DEA) and diisopropanolamine (DIPA), or tertiary amines as triethanolamine (TEA) and methyldiethanolamine (MDEA), but also ammonia and liquid alkali carbonates as $K_2CO_3$ and $NaCO_3$ can be used.

By swing adsorption, a unit for adsorbing selected compounds is meant. In this type of equipment, a dynamic equilibrium between adsorption and desorption of gas molecules over an adsorption material is established. The adsorption of the gas molecules can be caused by steric, kinetic, or equilibrium effects. The exact mechanism will be determined by the used adsorbent and the equilibrium saturation will be dependent on temperature and pressure. Typically, the adsorbent material is treated in the mixed gas until near saturation of the heaviest compounds and will subsequently need regeneration. The regeneration can be done by changing pressure or temperature. In practice, this means that a at least two reactor process is used, saturating the adsorbent at high pressure or low temperature initially in one reactor and then switching reactor, now desorbing the adsorbed molecules from the same reactor by decreasing the pressure or increasing the temperature. When the unit operates with changing pressures, it is called a pressure swing adsorption unit, and when the unit operates with changing temperature, it is called a temperature swing adsorption unit. Pressure swing adsorption can generate a hydrogen purity of 99.9% or above.

By membrane is meant separation over an at least partly solid barrier, such as a polymer, where the transport of individual gas species takes place at different rates defined by their permeability. This allows for up-concentration, or dilution, of a component in the retentate of the membrane. By cryogenic separation is meant a process utilizing the phase change of different species in the gas to separate individual components from a gas mixture by controlling the temperature.

In an embodiment, the hydrogen plant comprises two or more water gas shift units. Such water gas shift units are e.g. a high temperature water gas shift unit, a medium temperature water gas shift unit or a low temperature water gas shift unit.

In an embodiment, the hydrogen plant further comprises a heater unit for heating the feed gas upstream the reforming reactor system. The heater can be a fired heater or an electrically heated heater. In case of a fired heater, it may at least partly be driven by offgas from the separation processes.

In an embodiment, the hydrogen plant further comprises a gas purification unit and/or a prereforming unit upstream the reforming reactor system. The gas purification unit is e.g. a desulfurization unit, such as a hydrodesulfurization unit.

In an embodiment, the reforming reactor system further comprises a control system arranged to control the electrical power supply to ensure that the temperature of the gas exiting the pressure shell lies in a predetermined range and/or to ensure that the conversion of hydrocarbons in the feed gas lies in a predetermined range and/or to ensure the dry mole concentration of methane lies in a predetermined range and/or to ensure the approach to equilibrium of the steam reforming reaction lies in a predetermined range. Typically, the maximum temperature of the gas lies between 500° C. and 1000° C., such as between 850° C. and 1000° C., such as at about 950° C., but even higher temperatures are conceivable, e.g. up to 1300° C. However, the maximum temperature of the gas exiting the reforming reactor system may be as low as 500° C., for instance in a case where the reforming reactor system is of the bayonet type. The maximum temperature of the gas will be achieved close to the most downstream part of the first catalyst bed as seen in the flow direction of the feed gas.

The control of the electrical power supply is the control of the electrical output from the power supply. The control of the electrical power supply may e.g. be carried out as a control of the voltage and/or current from the electrical power supply, as a control of whether the electrical power supply is turned on or off or as a combination hereof. The power supplied to the electrically conductive material of the first catalyst bed can be in the form of alternating current or direct current. In an embodiment, the energy transferred to the macroscopic structure is in the range from 1 to 50 kW/m². These numbers are only exemplary and depends upon the dimensions of the structured catalyst. However, industrially available currents, voltages and frequencies will typically be sufficient to heat the structured catalyst. If alternative current is used, suitable frequencies could be in the range 50-60 Hz. The voltage between the at least two electrodes can be any appropriate voltage arranged to provide the desired heat flux. If the voltage is too low, the heat flux may become too low, and if the voltage is too high, the risk of electric arcs is increased. Exemplary values are e.g. a voltage between 50 and 4000 V, such as between 100 and 1000 V. Such values will render the compactness of the macroscopic structure and thus of the reactor system possible. Moreover, the current running between electrodes through the macroscopic structure can be any appropriate current, which together with the chosen voltage will provide the desired heat flux. The current may e.g. be between 100 and 2000 A, such as between 200 and 1500 A.

The predetermined temperature range of the gas exiting the pressure shell/the reforming reactor system is preferably the range from 500 to 1300° C., preferably in the range from 800° C. to 1150° C., such as 900° C. to 1000° C. Preferably, the range of approach to equilibrium of the steam methane reforming reaction is between 1 and 60° C., more preferably between 5 and 30° C., most preferably between 5 and 20° C.

In order to control the temperature of a reaction, the heat added/removed from a reforming reactor system needs to be balanced against the heat consumed/produced by the chemical reaction. The addition/removal of heat needs to be balanced against the rate of reaction and especially the approach to equilibrium as defined by β, where β is the ratio between the reaction quotient and the equilibrium constant of a reaction. A value of β approaching 1 means the reaction mixture is close to equilibrium and values approaching 0 means the reaction mixture is far from equilibrium. In general, it is desirable to have as high a rate of reaction as possible, which is achieved at a low β, as long as the temperature can be sufficiently controlled in parallel by balancing the energy demand.

In the case of the endothermic steam methane reforming reaction, heat needs to be added to ensure the reaction continues to proceed as otherwise the reaction will be equilibrated and the β value will approach 1 and the reaction will slow down. However, on the other side, it is undesirable if the temperature increases faster than the rate of reaction can follow as exposing unconverted hydrocarbons to high temperatures can result in carbon formation. A good way to follow this behavior is by the approach to equilibrium. The approach to equilibrium of the steam reforming reaction is found by initially calculating the reaction quotient (Q) of the given gas as:

$$Q = \frac{y_{CO} \cdot y_{H_2}^3}{y_{CH_4} \cdot y_{H_2O}} \cdot P^2$$

Here $y_j$ is the molar fraction of compound j, and P is the total pressure in bar. This is used to determine the equilibrium temperature ($T_{eq}$) at which the given reaction quotient is equal to the equilibrium constant:

$$Q = K_{SMR}(T_{eq})$$

where $K_{SMR}$ is the thermodynamic equilibrium constant of the steam methane reforming reaction. The approach to equilibrium of the steam methane reforming ($\Delta T_{app,SMR}$) reaction is then defined as:

$$\Delta T_{app,SMR} = T - T_{eq}$$

Where T is the bulk temperature of the gas surrounding the catalyst material used, such as the structured catalyst.

To ensure good performance of a steam reforming catalyst, it is desirable that the catalyst continuously works towards decreasing $\Delta T_{app,SMR}$. Classically, large scale industrial SMRs have been designed to obtain an approach to equilibrium of 5-20° C. at the outlet thereof.

With the current invention it is possible to control the heat flux and match this directly to the kinetic performance of the structured catalyst, as these are independent to some extent.

Another aspect of the invention relates to a process for producing hydrogen from a feed gas comprising hydrocarbons in a hydrogen plant. The hydrogen plant comprises a reforming reactor system with a pressure shell housing a first catalyst bed, where the first catalyst bed comprises an electrically conductive material and a catalytically active material. The catalytically active material is arranged to catalyze steam reforming of a feed gas comprising hydrocarbons. The reforming reactor system is provided with heat insulation between the first catalyst bed and the pressure shell. The process comprises the following steps:

pressurizing the feed gas to a pressure of between 5 and 200 bar, preferably between 30 and 200 bar, more preferably between 80 and 180 bar, supplying the pressurized feed gas to the reforming reactor system, allowing the feed gas to undergo steam reforming reaction over the first catalyst bed and outletting a high pressure product gas from the reforming reactor system, heating the catalytically active material by supplying electrical power via electrical conductors connecting an electrical power supply placed outside the pressure shell to the electrically conductive material, thereby allowing an electrical current to run through the electrically conductive material and thus heating at least part of the first catalyst bed to a temperature of at least 500° C., letting the product gas into a water gas shift unit downstream the reforming reactor system in order to generate a water gas shifted product gas, condensing water in the water gas shifted product gas and separating the water in a flash separation step, thereby providing a dry water gas shifted product gas, and removing at least $CO_2$ from the dry water gas shifted product gas in a gas separation unit downstream the water gas shift unit.

The gas provided by the process is a hydrogen gas rendered from the step of removing $CO_2$ from the water gas shifted product gas. It should be noted that the feed gas may comprises individual feed gasses, such as steam, hydrocarbon gas, carbon dioxide and hydrogen, and that the step of pressurizing the feed gas may comprise pressurizing individual feed gasses individually. In a preferred embodiment, substantially all of the individual feed gasses are pressurized upstream the reforming reactor system.

The process provides advantages similar to those outlined for the reforming reactor system. It should be noted, that the process may comprise further steps carried out upstream or downstream the reforming reactor system, such as further purification, pressurization, heating, cooling, etc. to provide the final hydrogen gas.

Moreover, it should be noted that the order in which the steps of the process are written are not necessarily the order in which the process steps take place, in that two or more steps may take place simultaneously, or the order may be different that indicated above.

The step of separating water from the process gas is e.g. a step of condensing water in the water gas shifted product gas and separating this in a flash separation step, thereby providing a dry water gas shifted product gas.

In an embodiment, the feed gas is pressurized to between 80 and 180 bar upstream the reforming reactor system. The hydrogen gas exiting the reforming reactor system can therefore in many cases be used directly, without the use of compressors or with the use of fewer and/or less complex compressors. For example, the hydrogen gas exiting the hydrogen plant is already pressurized to a pressure suitable for suited for being input into an ammonia plant or into a hydrotreater of a refinery plant without further pressurizing. Thus, no compressors will be downstream the reforming reactor system. This reduces the overall cost of the plant with a reforming reactor system of the invention.

In an embodiment, the process comprises the step of heating the feed gas let into the reforming reactor system is between 200° C. and 700° C. For externally heated SMRs, the temperature of the feed gas would normally be heated to a temperature between 450° C. and 650° C.; however, since the reforming reactor system used in the process is an internally heated reforming reactor system, the temperature of the feed gas may be as low as 200° C. However, in all embodiments the temperature and the pressure of the feed gas are adjusted to ensure that the feed gas is above the dew point.

In an embodiment of the process of the invention, the first catalyst bed comprises a structured catalyst comprising a macroscopic structure of electrically conductive material, where the macroscopic structure supports a ceramic coating and where the ceramic coating supports a catalytically active material. The macroscopic structure is heated by leading an electrical current through the macroscopic structure, so that the maximum temperature of the macroscopic structure lies between 500° C. and 1300° C. Preferably, the maximum temperature of the structured catalyst lies between 700° C. and 1100° C., such as between 900° C. and 1000° C. The maximum temperature of the structured catalyst depends upon the material of the macroscopic structure; thus, if the macroscopic structure is of FeCrAlloy, which melts at a temperature of between 1380° C. and 1490° C. (depending on the actual alloy), the maximum temperature should be somewhat below the melting point, such as at about 1300° C. if the melting point of the macroscopic structure is at about 1400° C., as the material will become soft and ductile when approaching the melting point. The maximum temperature may additionally be limited by the durability of the coating and catalytically active material.

In an embodiment the process according to the invention further comprises the step of inletting a cooling gas through an inlet through the pressure shell in order to allow a cooling gas to flow over at least one conductor and/or fitting for cooling the area or zone around the at least one conductor. The cooling gas may be any appropriate gas; examples of such gasses are hydrogen, nitrogen, steam, carbon dioxide or mixtures thereof. The cooling gas may flow through the conductor(s) and cool it (them) from within; in this case, the conductor(s) need(s) to be hollow to accommodate the cooling gas flowing within it/them. Part of the feed gas or a gas with the same composition as the feed gas may be used as cooling gas.

In an embodiment of the process, the space velocity of gas, evaluated as flow of gas relative to the geometric surface area of the structured catalyst, is between 0.6 and 60 $Nm^3/m^2/h$, such as between 3 and 17 $Nm^3/m^2/h$, or such as between 9 and 14 $Nm^3/m^2/h$. Given relative to the occupied volume of the structured catalyst, the space velocity is between 700 $Nm^3/m^3/h$ and 70000 $Nm^3/m^3/h$, such as between 3500 $Nm^3/m^3/h$ and 20000 $Nm^3/m^2/h$, or such as between 11000 $Nm^3/m^3/h$ and 16000 $Nm^3/m^3/h$. Given as a space velocity relative to the volume of active catalyst, i.e. the volume of the ceramic coat, it is between 6000 $Nm^3/m^3/h$ and 1200000 $Nm^3/m^3/h$. Operating within these ranges of the space velocity allows for a desired conversion. It should be noted, that the space velocity of the gas is meant to denote the space velocity of the gas entering the reactor system, viz. both the feed gas and the cooling gas.

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

SHORT DESCRIPTION OF THE FIGURES

FIG. 8a shows an embodiment of a structured catalyst for use in the reactor system of the invention;

FIG. 8b shows the current density temperature profile of the structured catalyst shown in FIG. 6a as a function of the electrical effect transferred to the structured catalyst;

DETAILED DESCRIPTION OF THE FIGURES

Throughout the Figures, like reference numbers denote like elements.

Figure 1:
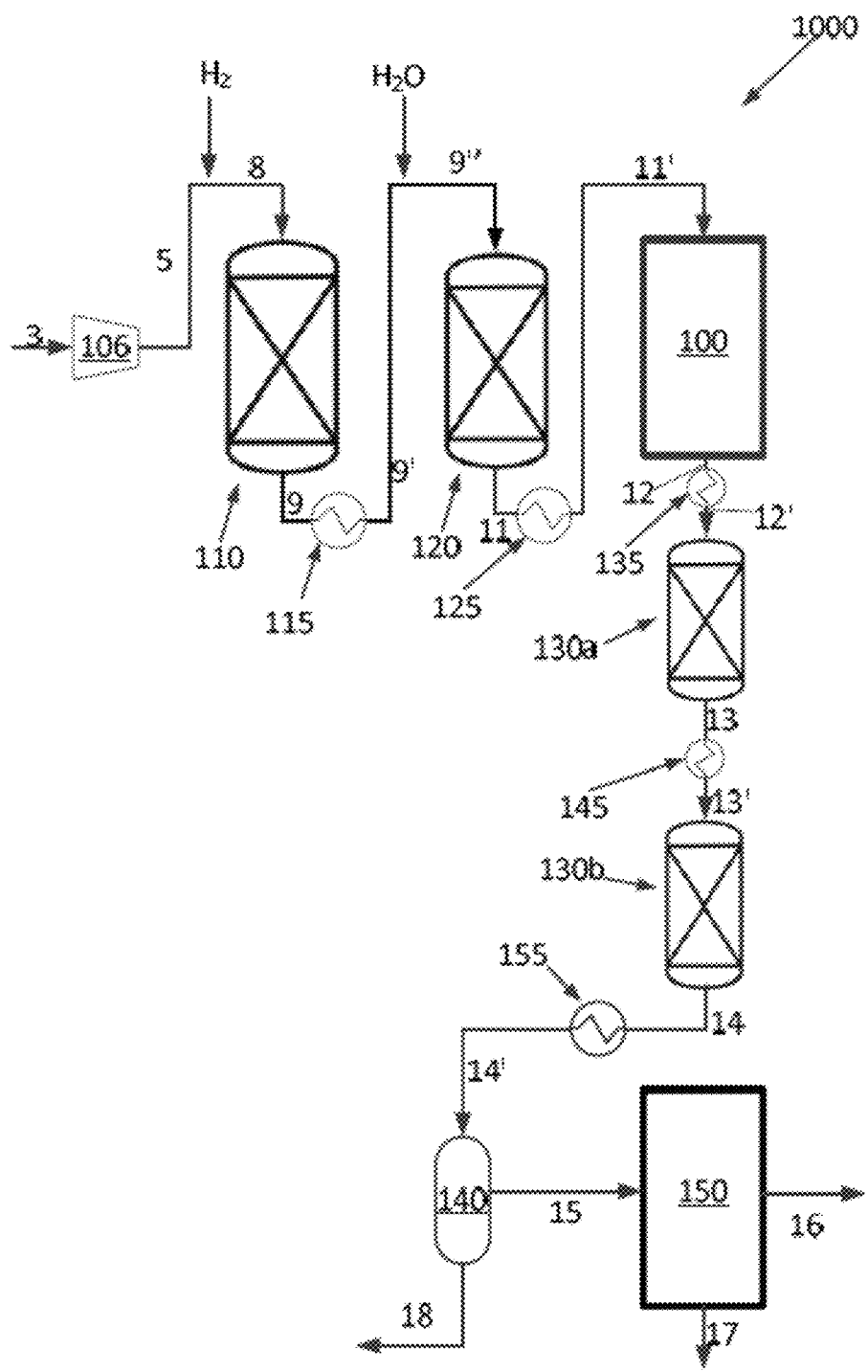
FIG. 1 shows a hydrogen plant according to an embodiment of the invention.

FIG. 1 shows a hydrogen plant 1000 for producing high pressure hydrogen according to an embodiment of the invention. The hydrogen plant 1000 comprises a reforming reactor system 100 for producing a synthesis gas from a feed gas comprising hydrocarbons. A hydrocarbon gas 3 is compressed to a compressed hydrocarbon gas 5 in a compressor unit 106. Typically, the hydrocarbon gas 3 comprises $CH_4$ and optionally also higher hydrocarbons in relatively small amounts, in addition to small amounts of other gasses such as carbon monoxide, carbon dioxide, and possibly also some nitrogen and argon. Thus, a main constituent of the hydrocarbon gas 3 may be natural gas, town gas, naphtha or a mixture of methane and higher hydrocarbons.

Hydrogen $H_2$ is added to the compressed hydrocarbon gas 5 to obtain a first feed gas 8 comprising hydrocarbons and hydrogen. Typically, the added hydrogen is also compressed (not shown in FIG. 1) prior to being added to the compressed hydrocarbon gas 5. Alternatively, the hydrogen is added upstream the compressor unit 106 and is thus also compressed in the compressor unit 106.

The first feed gas 8 is pressurized to a pressure between 5 and 200 bar and has been heated (not shown in FIG. 1) to a suitable process temperature. The first feed gas 8 is led to an optional gas purification unit 110. The optional gas purification unit 110 is e.g. a sulfur removal unit, for example in the form of a hydro desulfurizing unit combined with a sulfur absorption unit. A purified gas 9 exits the optional gas purification unit 110, and is heated in a heat exchanger 115 to a heated purified gas 9'. Steam $H_2O$ is added to the heated purified gas 9' to form a second feed gas 9'' that is led into an optional prereforming unit 120. Alternatively, steam $H_2O$ is added directly downstream the optional gas purification unit 110 and subsequently heated in the heat exchanger 120.

The steam $H_2O$ is also pressurized (not shown in FIG. 1) prior to being added to the heated purified gas 9'. The second feed gas 9'' is thus a gas comprising a hydrocarbon gas with one or more hydrocarbons mixed with steam, hydrogen and possibly other constituents. Typically, the second feed gas 9'' has a predetermined ratio of hydrocarbon gas, steam and hydrogen, and potentially also carbon dioxide.

In the prereforming unit 120, higher hydrocarbons in the second feed gas 9'' reacts with steam and are converted to a mixture of $CH_4$, $H_2$, CO, $CO_2$ and $H_2O$ as an initial step in the process of producing high pressure hydrogen. The pressure of the prereformed gas 11 leaving the prereforming unit 120 is substantially equal to the pressure of the gas 9'' entering the prereforming unit 120. The prereformed gas 11 from the prereforming unit 120 is heated to a suitable process temperature by heat exchange in a heat exchanger 125, thereby rendering a third feed gas 11' which is led into a reforming reactor system 100.

The reforming reactor system 100 comprises (not shown in FIG. 1) a first catalyst bed comprising an electrically conductive material and a catalytically active material, where the catalytically active material is arranged for catalyzing steam reforming of a feed gas comprising hydrocarbons, a pressure shell (not shown in FIG. 1) housing the first catalyst bed, a heat insulation layer (not shown in FIG. 1) between the first catalyst bed and the pressure shell, and at least two conductors electrically (not shown in FIG. 1) connected to the electrically conductive material and to an electrical power supply (not shown in FIG. 1) placed outside the pressure shell. The electrical power supply is dimensioned to heat at least part of the first catalyst bed to a temperature of at least 500° C. by passing an electrical current through the electrically conductive material. The pressure shell has a design pressure of between 5 and 200 bar, preferably between 80 and 180 bar. Inside the reforming reactor system 100, the third feed gas 11' undergoes steam methane reforming, resulting in a product gas 12 in the form of a synthesis gas. The product gas 12 is cooled to a cooled product gas 12' having a suitable process temperature in a heat exchanger 135 and is subsequently led to two water gas shift units 130a, 130b with intermediate temperature regulation in a heat exchanger 145. In FIG. 1, two water gas shift unit 130a, 130b are shown, e.g. a high temperature water gas shift unit 130a and a low temperature water gas shift unit 130b but the hydrogen plant 1000 might comprise only one water gas shift unit or more than two water shift units. The water gas shift units 130a, 130b are arranged to carry out water gas shift reaction in order to convert $H_2O$ and CO in the cooled product gas 12' to $H_2$ and $CO_2$. This results in a water gas shifted product gas 13 from the high temperature water gas shift unit 130a; the water gas shifted product gas 13 is subsequently cooled to a cooled water gas shifted product gas 13' which is sent to a low temperature water gas shift unit 130b. The water gas shifted product gas 14 exiting the low temperature water gas shift unit 130b is cooled in a heat exchanger 155 to condense water in the process gas and the resultant stream 14' is subsequently divided in a gas phase 15 and a liquid phase 18 in a flash separator 140. The gas phase 15 is led to a gas separation unit 150 which may be a pressure swing absorption unit, a $CO_2$ wash, a membrane, a cryogenic separation unit, a combination of these or any other appropriate unit arranged to separate $H_2$ from the remaining gas or off-gas 17 which may comprise $CO_2$, $CH_4$, CO, $N_2$, and Ar. The gasses exiting the gas separation unit 150 are a high pressure hydrogen gas 16 and an off-gas 17. The off-gas 17 will typically be rich in $CO_2$.

The first feed gas 8 is pressurized prior to letting it into the optional gas purification unit 110, and the gasses 9, 9', 9'', 11, 11', 12, 12', 13, 13', 14 and 14', 15 and 16 are compressed to a pressure of substantially the same pressure as the first feed gas 8. However, it should be foreseen that a minor pressure loss will occur through the hydrogen plant 1000, such that the pressure of the high pressure hydrogen gas 16 is up to about 5% lower than the pressure of the first feed gas 8. Thus, if the pressure of the hydrogen gas 16 should be about 100 bar, the pressure of the first feed gas 8 should preferably be at about 105 bar.

The hydrogen plant 1000 may furthermore comprise other heating means, such as further heat exchangers and/or a fired heater in order to heat the gasses within the hydrogen plant 1000. In order to provide a feed gas at a high pressure, one or more compressor may be present in the hydrogen plant upstream the reactor unit 100, preferably upstream the gas purification unit 110. Of such compressors, only the compressor 106 is shown in FIG. 1; however, it is understood that further compressors may exist, e.g. for compressing the inlet streams of hydrogen $H_2$ and $H_2O$.

Figure 2A:
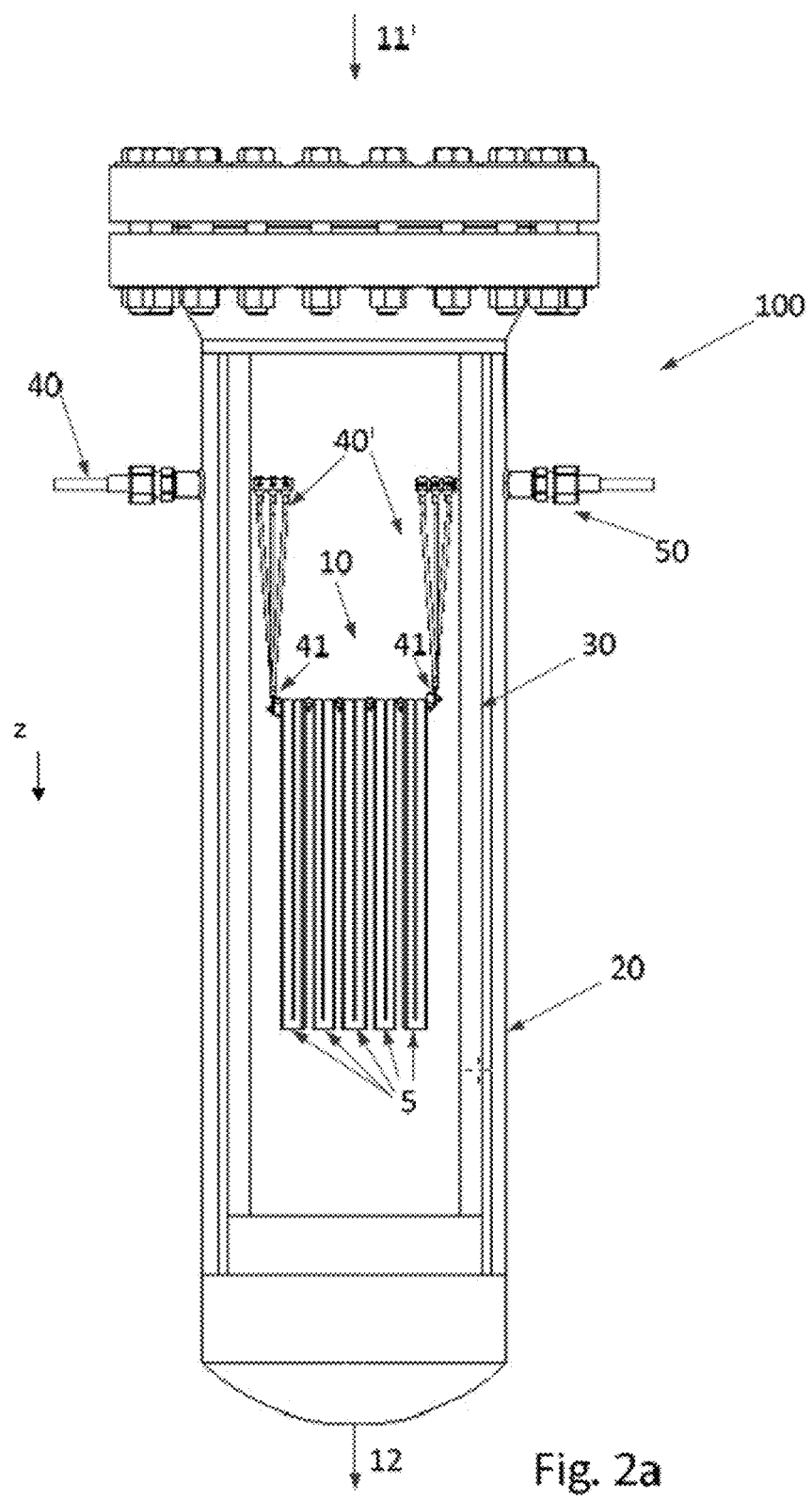
FIG. 2a shows a cross section through an embodiment of the inventive reforming reactor system with a structured catalyst comprising an array of macroscopic structures, in a cross section.

FIG. 2a shows a cross section through an embodiment of a reforming reactor system 100 according to the invention.

The reforming reactor system 100 comprises a structured catalyst 10, arranged as an array of macroscopic structures 5. Each macroscopic structure 5 in the array is coated with a ceramic coating impregnated with catalytically active material. The reforming reactor system 100 moreover comprises conductors 40, 40' connected to a power supply (not shown in the Figures) and to the structured catalyst 10, viz. the array of macroscopic structures 5. The conductors 40, 40' are led through the wall of a pressure shell 20 housing the structured catalyst and through insulating material 30 on the inner side of the pressure shell, via fittings 50. The conductors 40' are connected to the array of macroscopic structures 5 by conductor contact rails 41.

In an embodiment, the electrical power supply supplies a voltage of 26V and a current of 1200 A. In another embodiment, the electrical power supply supplies a voltage of 5V and a current of 240 A. The current is led through electrical conductors 40, 40' to conductor contact rails 41, and the current runs through the structured catalyst 10 from one conductor contact rail 41, e.g. from the conductor contact rail seen to the left in FIG. 2a, to the other conductor contact rail 41, e.g. the conductor contact rail seen to the right in FIG. 2a. The current can be both alternating current, and e.g. run alternating in both directions, or direct current and run in any of the two directions.

The macroscopic structures 5 are made of electrically conductive material. Especially preferred is the alloy kanthal consisting of aluminum, iron and chrome. The ceramic coating, e.g. an oxide, coated onto the structure catalysts 5 is impregnated with catalytically active material. The conductors 40, 40' are made in materials like iron, aluminum, nickel, copper or alloys thereof.

During operating, the third feed gas 11' enters the reforming reactor system 100 from above as indicated by the upper arrow and the product gas 12 exits the reforming reactor system from the bottom thereof as indicated by the lower arrow.

Figure 2B:
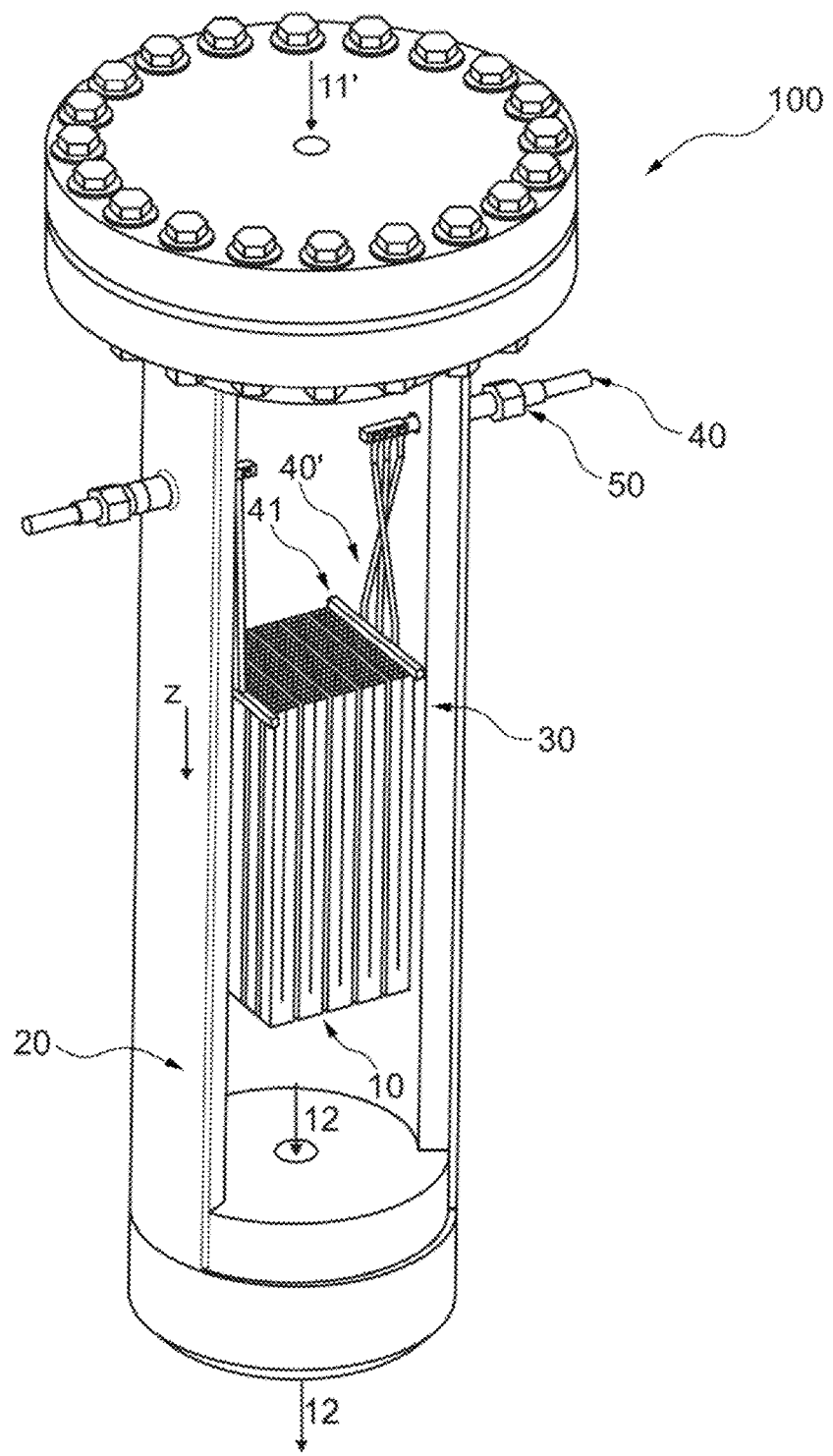
FIG. 2b shows the reforming reactor system of FIG. 2a with a part of the pressure shell and heat insulation layer removed.
Figure 3:
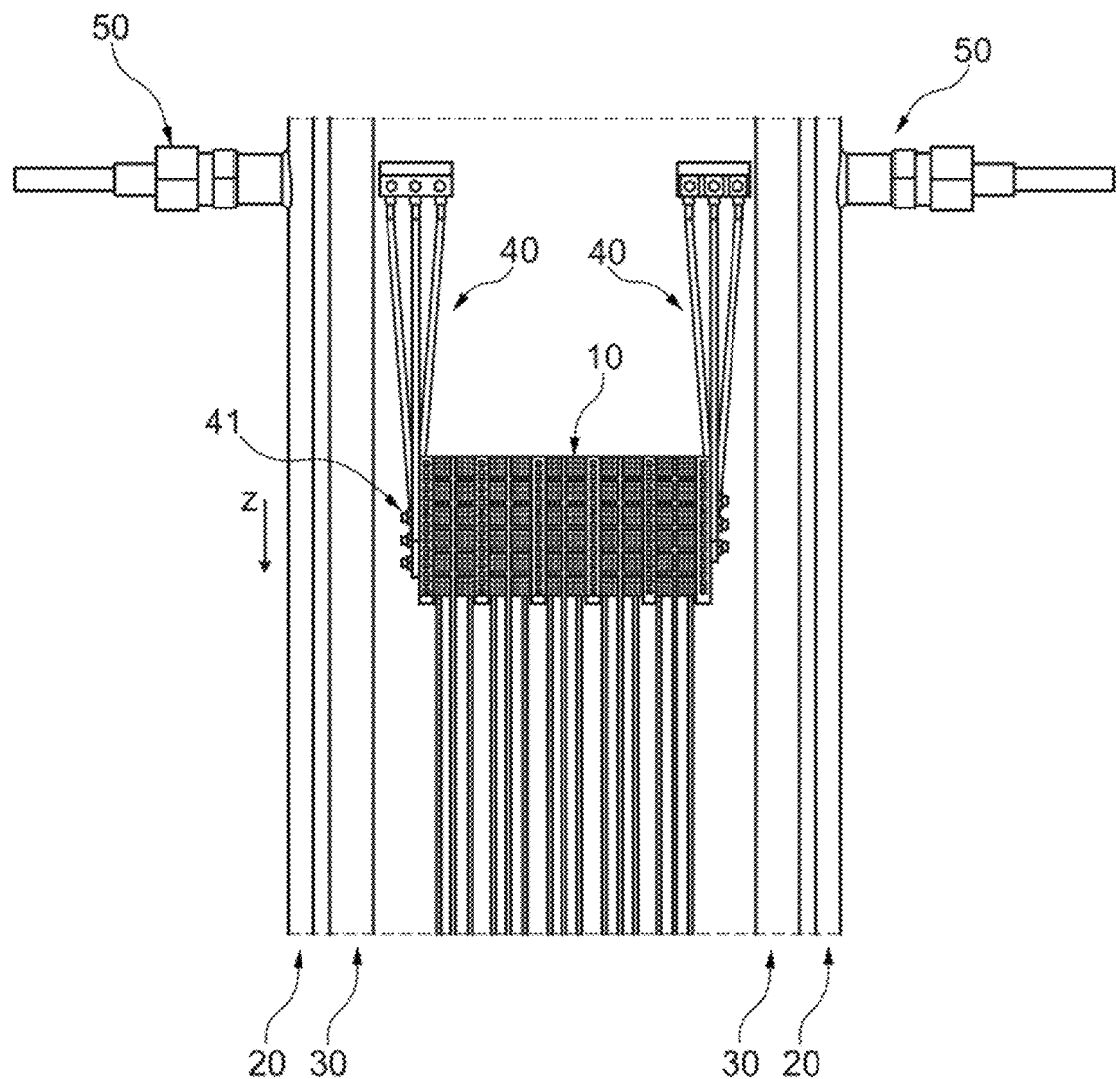
FIG. 3 is an enlarged view of a part of the reforming reactor system.

FIG. 2b shows the reforming reactor system 100 of FIG. 2a with a part of the pressure shell 20 and heat insulation 30 layer removed and FIG. 3 is an enlarged view of a part of the reforming reactor system 100. In FIGS. 2b and 3 the connections between conductors 40' and conductor contact rails 41 are shown more clearly than in FIG. 2a. Moreover, it is seen that the conductors 40 are led through the walls of the pressure shell in a fitting 50, and that the one conductor 40 is split up into three conductors 40' within the pressure shell. It should be noted, that the number of conductors 40' may be any appropriate number, such as smaller than three or even larger than three.

In the reforming reactor system 100 shown in FIGS. 2a, 2b and 3, the conductors 40, 40' are led through the wall of a pressure shell 20 housing the structured catalysts and through insulating material 30 on the inner side of the pressure shell, via fittings 50. The third feed gas 11' for steam reforming is inlet into the reforming reactor system 100 via an inlet in the upper side of the reforming reactor system 100 as shown by the reference number 11', and product gas 12 in the form of a reformed gas exists the reforming reactor system 100 via an outlet in the bottom of the reforming reactor system 100 as shown by the reference number 12. Moreover, one or more additional inlets (not shown in FIGS. 2a to 3) advantageously exist close to or in combination with the fittings 50. Such additional inlets allow a cooling gas to flow over, around, close to, or inside at least one conductor within the pressure shell to reduce the heating of the fitting. The cooling gas could e.g. be hydrogen, nitrogen, steam, carbon dioxide or mixtures thereof. The temperature of the cooling gas at entry into the pressure shell may be e.g. about 100° C.

In the reforming reactor system 100 shown in FIGS. 2a to 3, inert material (not shown in FIGS. 2a-3) is advantageously present between the lower side of the structured catalyst 10 and the bottom of the pressure shell. Moreover, inert material is advantageously present between the outer sides of the structured catalyst 10 of macroscopic structures 5 and the insulating material 30. Thus, one side of the insulating material 30 faces the inner side of the pressure shell 20 and the other side of the insulating material 30 faces the inert material. The inert materiel is e.g. ceramic material and may be in the form of pellets. The inert material assists in controlling the pressure drop across the reforming reactor system 100 and in controlling the flow of the gas through the reforming reactor system 100, so that the gas flows over the surfaces of the structured catalyst 10.

Figure 4:
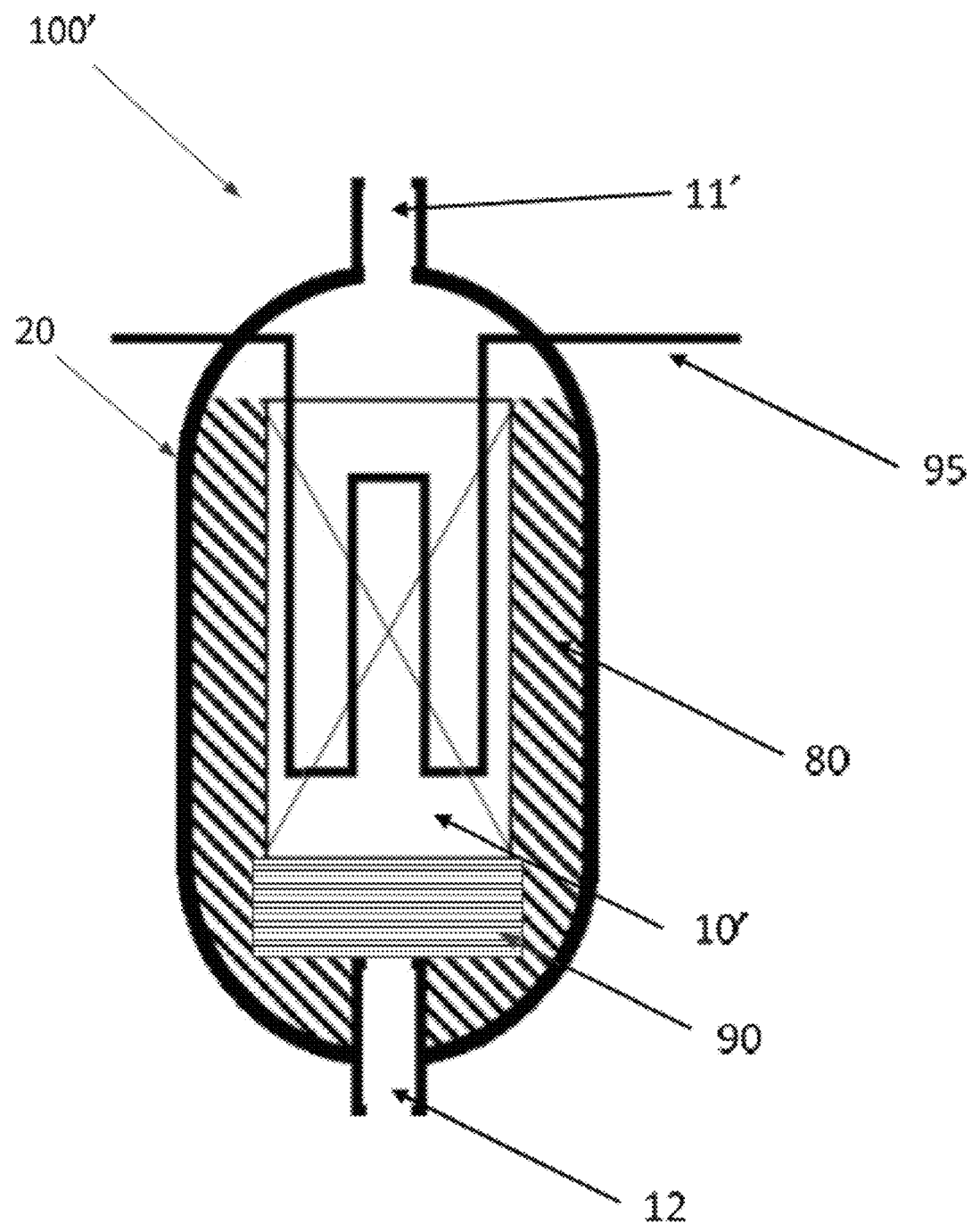
FIG. 4 shows a schematic cross section through an embodiment of the reforming reactor system comprising a structured catalyst.

FIG. 4 show a schematic cross section through another embodiment of the reforming reactor system 100' of a hydrogen plant according to the invention. The reforming reactor system 100' comprises a first catalyst bed 10' consisting of catalyst pellets, extrudates or granulates. The reforming reactor system 100' comprises a pressure shell 20 and a heat insulation layer 80 between the first catalyst bed 10' and the pressure shell 20. Inert material 90 can be used to fill the gap between the first catalyst bed 10' and the heat insulation layer 80 or the pressure shell 20. In FIG. 4, the inert material 90 is indicated by a horizontally hatched area; the inert material 90 may be in any appropriate form, e.g. in the form of inert pellets, and it is e.g. of ceramic material. The inert material 90 assists in controlling the pressure drop through the reforming reactor system and in controlling the flow of the gas through the reforming reactor system. Moreover, the inert material typically has a heat insulating effect.

The reforming reactor system 100' of FIG. 4 moreover comprises an electrically conductive material in the form of an embedded resistor 95 embedded in the first catalyst bed 10'. This embedded resistor can be in any appropriate form of plates, spirals, rods, or similar, positioned within or against the catalyst material. In an embodiment, the embedded resistor 95 supports a ceramic coating, and the ceramic coating supports a catalytically active material. Thus, the embedded resistor may, similar to the macroscopic support, be coated with a ceramic coating to directly support a catalytically active phase while still being embedded in the first catalyst bed. Thus, in this embodiment, the first catalyst bed surrounds the embedded resistor. The catalyst material of the first catalyst bed may comprise an appropriate combination of catalyst support and catalytically active phase to facilitate the endothermic reaction.

Figure 5:
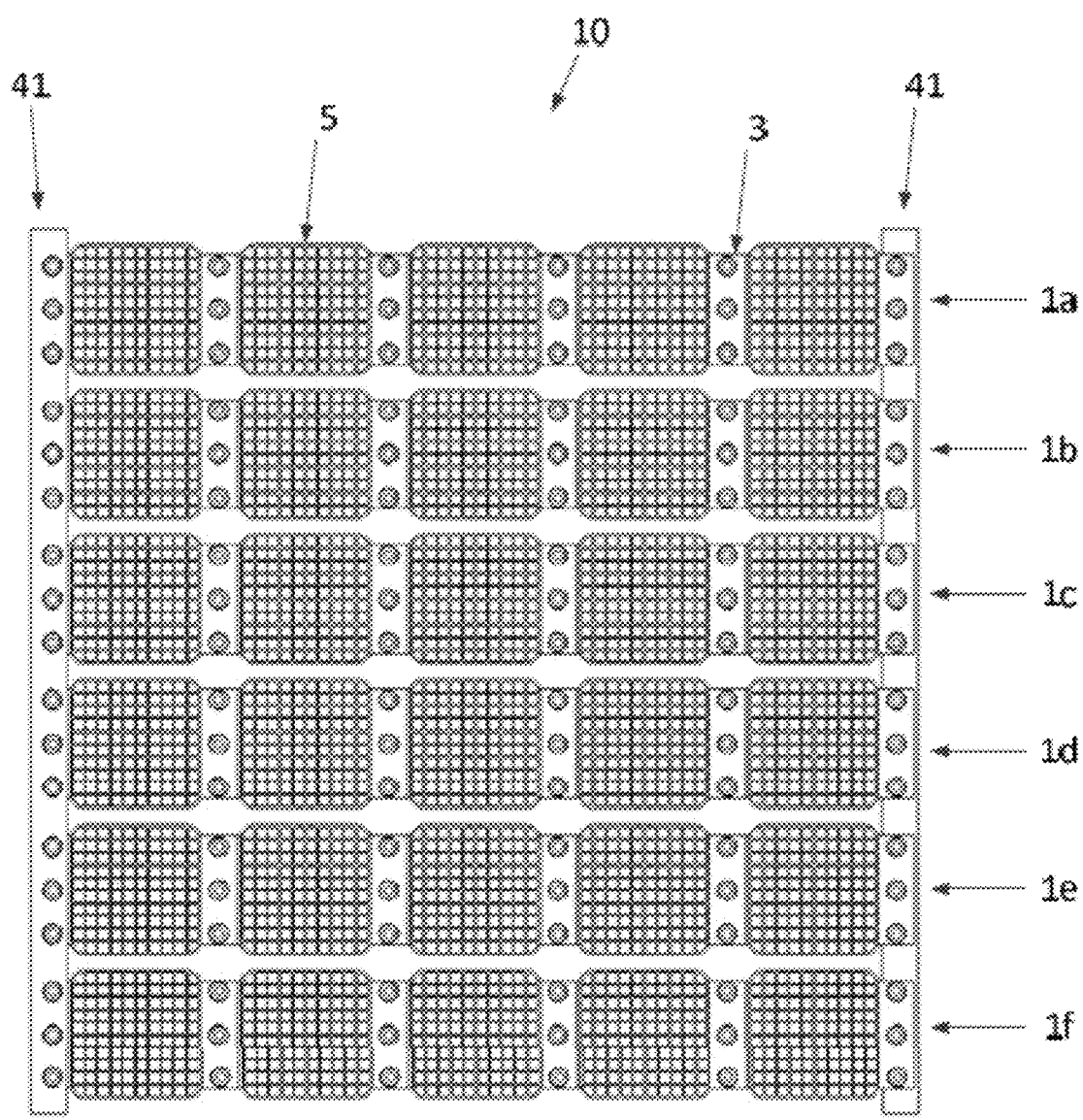
FIGS. 5 and 6 show an embodiment of a structured catalyst with an array of macroscopic structures as seen from above and from the side, respectively.
Figure 6:
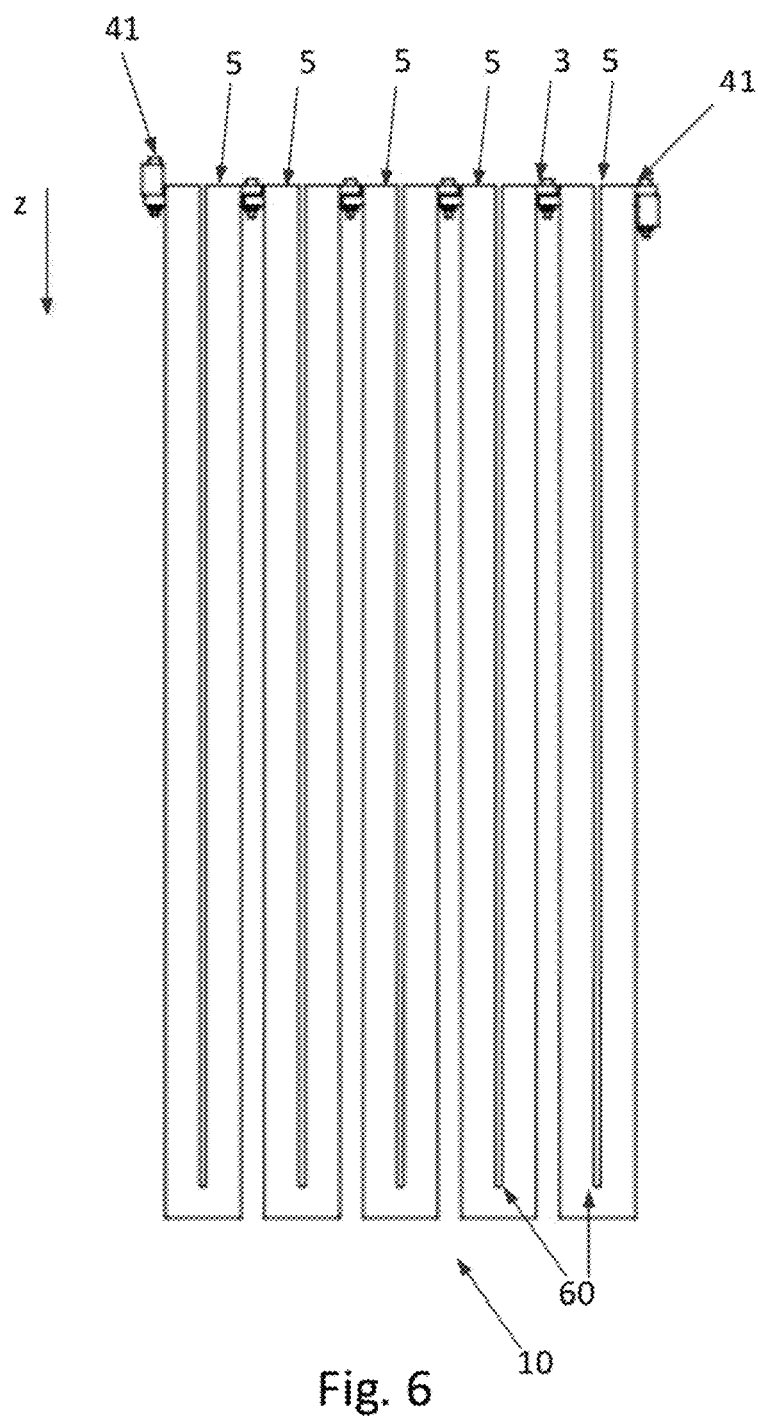

FIGS. 5 and 6 show an embodiment of a structured catalyst comprising an array of macroscopic structures as seen from above and from the side, respectively. FIG. 5 shows a structured catalyst 10 comprising an array of macroscopic structures 5 seen from above, viz. as seen from the arrow 11' in FIGS. 2a and 2b. The array has 6 rows, viz. 1a, 1b, 1c, 1d, 1e and 1f, of five macroscopic structures 5. The macroscopic structures 5 in each row are connected to its neighboring macroscopic structure (s) in the same row and the two outermost macroscopic structures in each row are connected to a conductor contact rail 41. The neighboring macroscopic structure 5 in a row of macroscopic structures are connected to each other by means of a connection piece 3.

FIG. 6 shows the structured catalyst 10 having an array of macroscopic structures 5 of FIG. 5 seen from the side. From FIG. 6, it can be seen that each macroscopic structure 5 extends longitudinally perpendicular to the cross section seen in FIG. 5. Each macroscopic structure 5 has a slit 60 cut into it along its longitudinal direction (see FIG. 6). Therefore, when energized by the power source, the current enters the array of macroscopic structures 5 via a conductor contact rail 41, is led through the first macroscopic structure 5 downwards until the lower limit of the slit 60 and is subsequently led upwards towards a connection piece 3 and a neighboring macroscopic structure 5. The current is thus led via a corresponding zigzag path, downwards and upwards, through each macroscopic structure 5 in each row 1a-1f of macroscopic structures 5 in the array 10. This configuration advantageously increases the resistance over the structured catalyst 10.

Figure 7A:
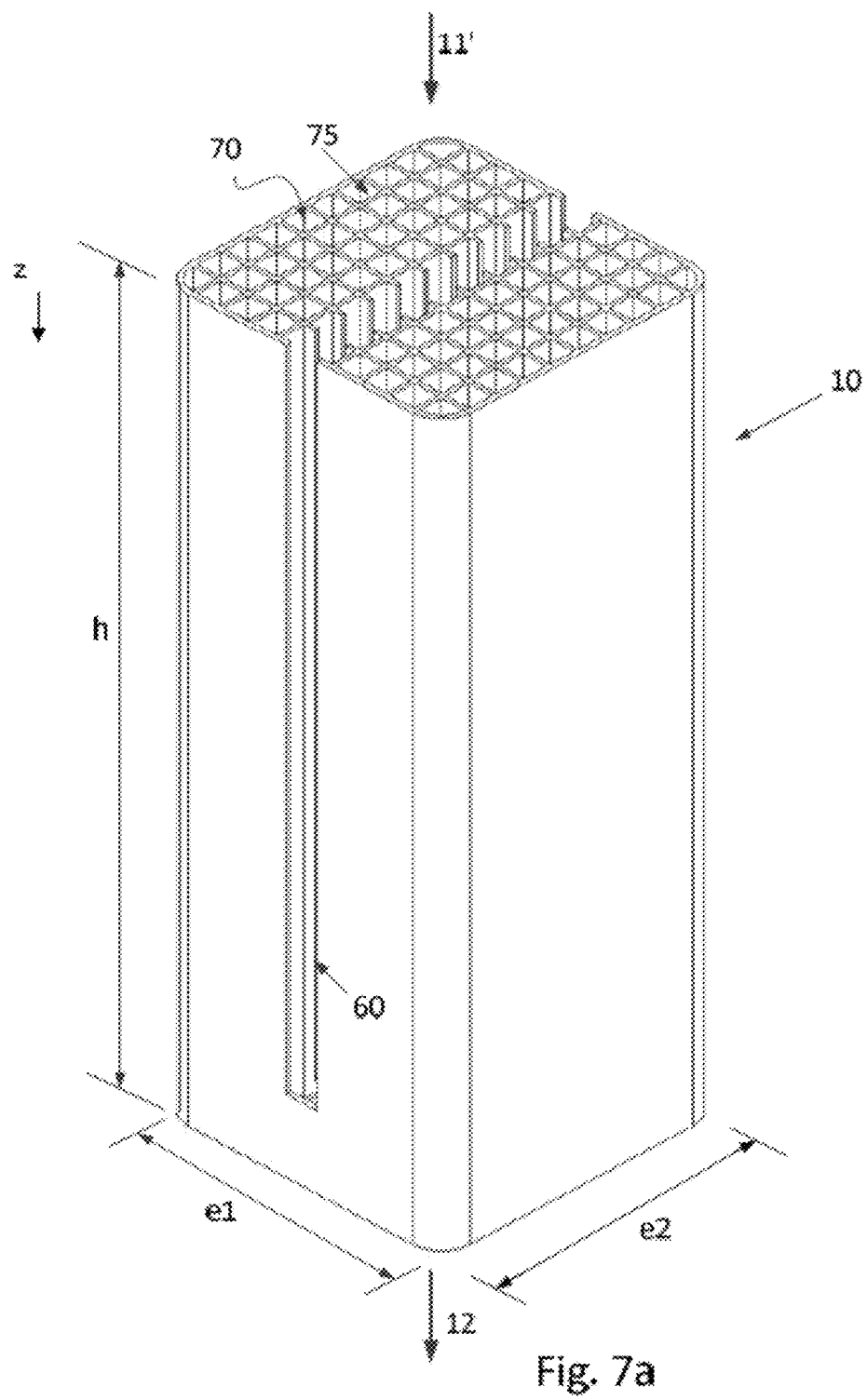
FIG. 7a shows an embodiment of the structured catalyst of the invention.

FIG. 7a shows an embodiment of a structured catalyst 10 for use in a hydrogen plant of the invention, in a perspective view. The structured catalyst 10 comprises a macroscopic structure that is coated with a ceramic coating impregnated with catalytically active material. Within the structured catalyst are channels 70 extending along the longitudinal direction (shown by the arrow indicate 'h' in FIG. 7a) of the macroscopic structure 5; the channels are defined by walls 75. As shown in FIG. 7a, the walls 75 define a number of parallel, square channels 70 when seen from the direction of flow as indicated by the arrow 12. The structured catalyst 10 has a substantially square perimeter when seen from above, defined by the edge lengths e1 and e2. However, the perimeter could also be circular or another shape.

The walls 75 of the structured catalyst 10 are of extruded or 3D printed material coated with a ceramic coating, e.g. an oxide, which has been coated onto the macroscopic structure. In the Figures, the ceramic coating is not shown. The ceramic coating is impregnated with catalytically active material. The ceramic coating and thus the catalytically active material are present on every walls within the structured catalyst 10 over which the gas flow flows during operation and interacts with the heated surface of the structured catalyst and the catalytically active material.

Thus, during use in a reforming reactor system 100 for steam reforming, a hydrocarbon feed gas flows through the channels 70 and interacts with the heated surface of the structured catalyst and with the catalytically active material supported by the ceramic coating.

A slit 60 has been cut into the structured catalyst 10 shown in FIG. 7a. This slit 60 forces a current to take a zigzag route, in this instance downwards and subsequently upwards, within the macroscopic structure thereby increasing the current path, the resistance and consequently the heat dissipated within the macroscopic structure. The slit 60 within the macroscopic structure may be provided with embedded insulating material in order to ensure that no current flows in the transverse direction of the slit 60.

The channels 70 in the structured catalyst 5 are open in both ends. In use of the structured catalyst in a reforming reactor system, a hydrocarbon feed gas flows through the unit, in the direction shown by arrows 11' and 12 in FIGS. 2a and 2b, and gets heated via contact with the walls 75 of the channels 70 and by heat radiation. The heat initiates the desired steam reforming process. The walls 75 of the channels 70 may e.g. have a thickness of 0.5 mm, and the ceramic coating coated onto the walls 75 may e.g. have a thickness of 0.1 mm. Even though the arrows 11' and 12 (see FIGS. 2a and 2b) indicate that the flow of the hydrocarbon feed gas is down-flow, the opposite flow direction, viz. an up-flow, is also conceivable.

Figure 7B:
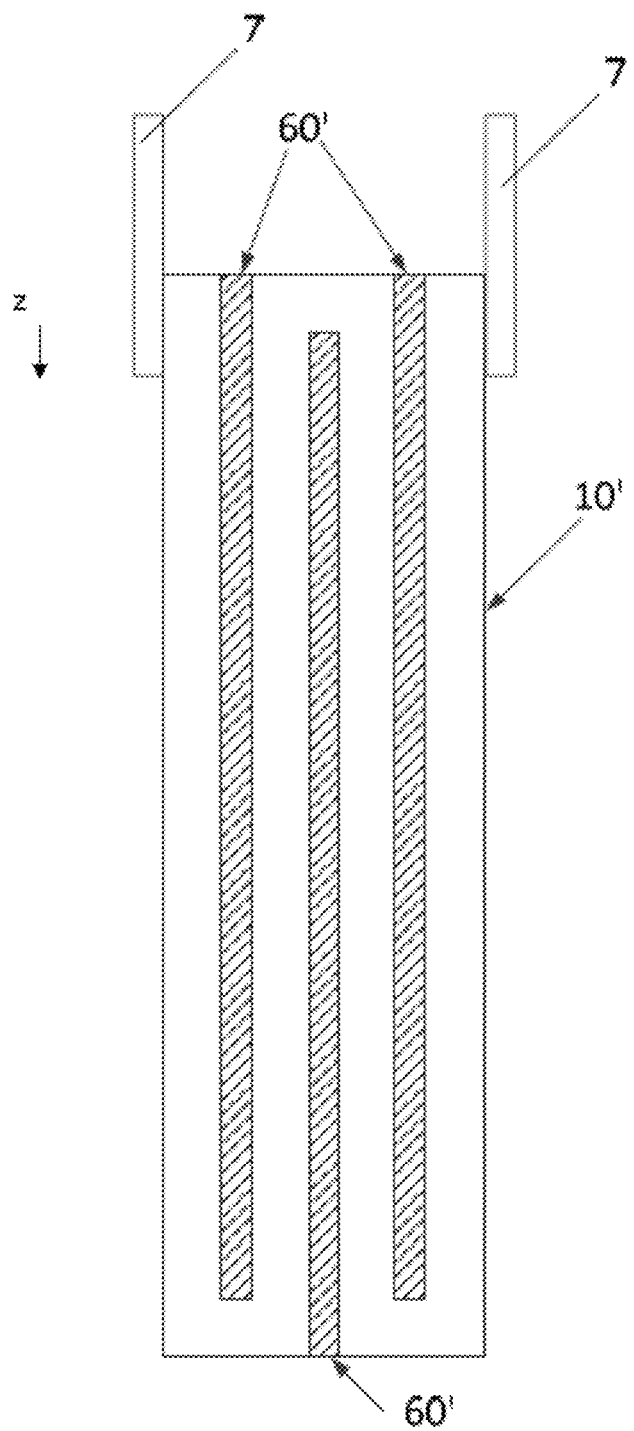
FIG. 7b is a schematic drawing of a cross-section through a structured catalyst with electrically insulating parts.

FIG. 7b is a schematic drawing of a cross-section through a structured catalyst 10' of the invention, with electrically insulating parts 60'. The electrically insulating parts are shown as hatched parts in FIG. 7b. In the embodiment shown in FIG. 7b, three pieces of electrically insulating parts 60' intersects the structured catalyst 10' in most of the longitudinal direction thereof. Conductors or connectors 7 are connected to the upper side of the structured catalyst 10' as seen in FIG. 7b. During use of the structured catalyst 10', the conductors 7 are connected to a power supply and a hydrocarbon feed gas is brought into contact with the structured catalyst 10'. Thus, current runs from the first conductor through the structured catalyst 10' in a zigzag direction, viz. downwards from the first conductor and around the lower side of the first electrically insulating part 60', subsequently upwards and around the upper side of the middle electrically insulating part 60', then downwards again and around the lower side of the third electrically insulating part 60' and finally upwards to the second conductor 7. It should be noted that any appropriate number of electrically insulating parts 60' is conceivable. The electrically insulating parts 60' are solid and of electrically insulating material, e.g. glass, and they are provided in cuts or slits in the macroscopic structure. The electrically insulating parts 60' ensures that the parts of the macroscopic structure on the sides electrically insulating parts 60' are kept apart from each other. It should be noted that in all the embodiments, the direction of flow of gas may be the same as the direction of the current through the structured catalyst, or it may be different. In the embodiment of FIG. 7b, the direction of flow of gas is e.g. from the upper side of the structured catalyst 10' towards the bottom of the structured catalyst 10'; thus, the flow of current only the same as the direction of the flow of gas as some parts of the structured catalyst 10', whilst the direction of the current is transverse to the direction of the flow of gas at some parts and opposite (upwards) in some parts.

FIG. 8a shows an embodiment of a structured catalyst 10" for use in the reactor system of the invention. FIG. 8a shows the structured catalyst 10" in a perspective view. It can be seen that the structured catalyst 10" has a single vertical slit 60 along the longitudinal axis of the catalyst 10" as shown in FIG. 8a. The single vertical slit 60 extends from the top of the structured catalyst 10" towards the bottom thereof, along about 90% of the length of the structured catalyst. The single vertical slit 60 can be seen as parting the structured catalyst 10" into two halves. Each of these two halves has five horizontal slits 65. The vertical slit 60 and the horizontal slits 65 function to direct the current in a zig-zag route through the structured catalyst.

FIG. 8b shows the current density of the structured catalyst 10" shown in FIG. 8a as a function of the electrical effect transferred to the structured catalyst 10". FIG. 8b is the result of a multiphysics computational fluid dynamics simulations in Comsol software of the current distribution of the structure in FIG. 8a. In FIG. 8b the structured catalyst 10" is seen from the side. Two electrodes (not shown in FIG. 8b) are connected to the upper end on the left side of the structured catalyst 10". As illustrated by the intensity of the current density, as depicted on the scale in the right part of FIG. 8b, when a power source is connected to the structured catalyst 10", a current runs from the upper end thereof in zig-zag form, due to the horizontal slits, to the bottom of the structure catalyst 10", to the back thereof, viz. into the paper as seen in FIG. 8b, and subsequently upwards in zig-zag form towards the second electrode. The temperature of the structured catalyst 10" depends upon the current density throughout the structured catalyst 10". It can be seen in FIG. 8b, that the current density is highest at the end points of horizontal slits 65 into the structured catalyst 10". These points are the points where the current path turns direction, i.e. where the current through the structured catalyst 10" is forced or directed in another direction. Moreover, it can be deduced that the current density vector of the principal current path has a non-zero component value parallel to the length of the structured catalyst for more than 80% of the structure. In conclusion, it is clear from FIG. 8b that the principal current path can be controlled in the structured catalyst. This feature gives control of the temperature profile inside the structured catalyst.

It should be noted, that even though the structured catalysts shown in the figures are shown as having channels with a square cross section, as seen perpendicular to the z-axis, any appropriate shape of the cross sections of the channels is conceivable. Thus, the channels of the structured catalyst could alternatively be e.g. triangular, hexagonal, octagonal, or circular, where triangular, square, and hexagonal shapes are preferred.

Figure 9A:
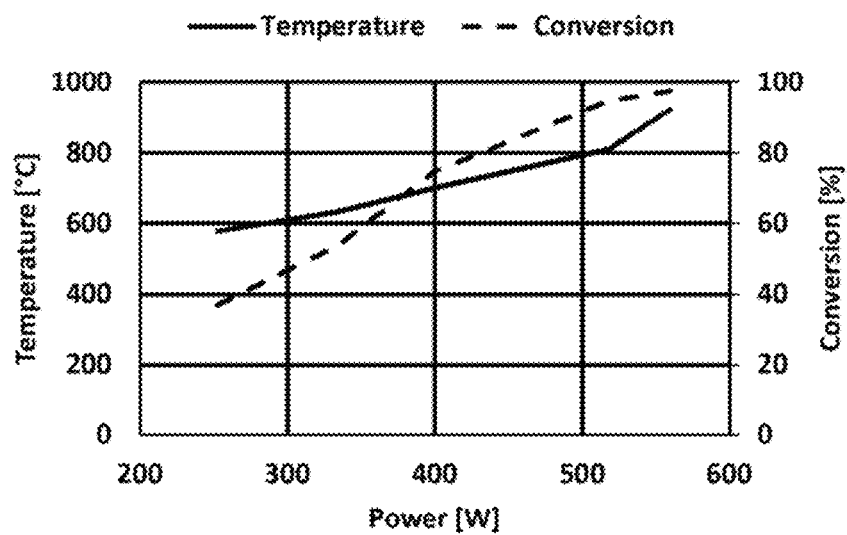
FIGS. 9a and 9b show temperature and conversion profiles as a function of electrical effect transferred to the structured catalyst.
Figure 9B:
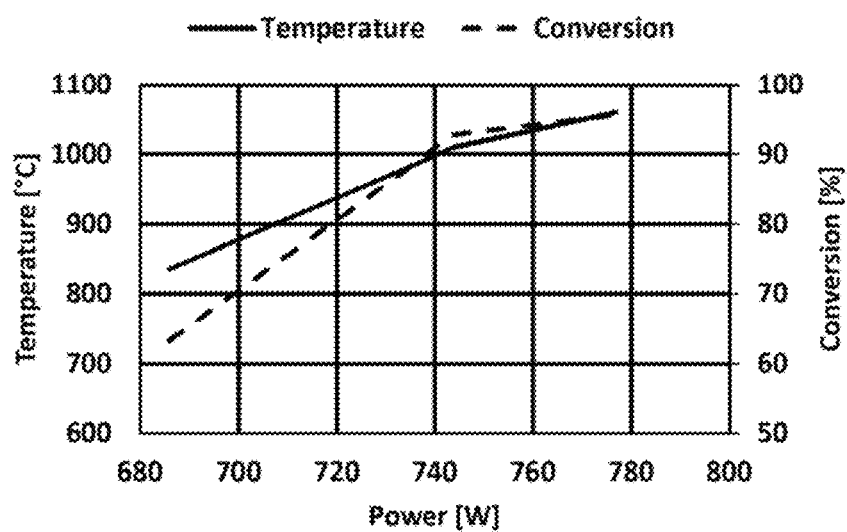

FIGS. 9a and 9b shows temperature and conversion profiles as a function of electrical effect transferred to the structured catalyst. FIG. 7a is the result of a laboratory test of bench scale reactor system having a length of 12 cm and a volume 108 cm$^3$ of the structured catalyst as defined by the outer walls/sides thereof and configuration as depicted in FIG. 1 where Cu conductors has been welded to the first 2 cm of the monolith on opposing sides in the first end. The pressure of the pressure shell was 3.5 bar, the temperature of the feed gas inlet into the reactor system was about 200° C. The composition of the feed gas was 31.8% $CH_4$, 2.4% Hz, 65.8% $H_2O$ and the total gas flow was 102.2 Nl/h. It should be noted, that the energy balance is substantially better in a larger scale than in the small scale experimental conditions behind the graphs of FIG. 9a, due to high energy loss in this relative small scale. However, it is clear from FIG. 9a that with increasing power, both the conversion of methane and the temperature increases. The temperature reaches above 900° C. and the methane conversion reaches above 98%.

FIG. 9b shows a similar experiment as described above, but with a pressure of 21 bar. Again, it is clear from FIG. 9b that with increasing power, both the conversion of methane and the temperature increases. The temperature reaches above 1060° C. and the methane conversion reaches above 95%.

Figure 10A:
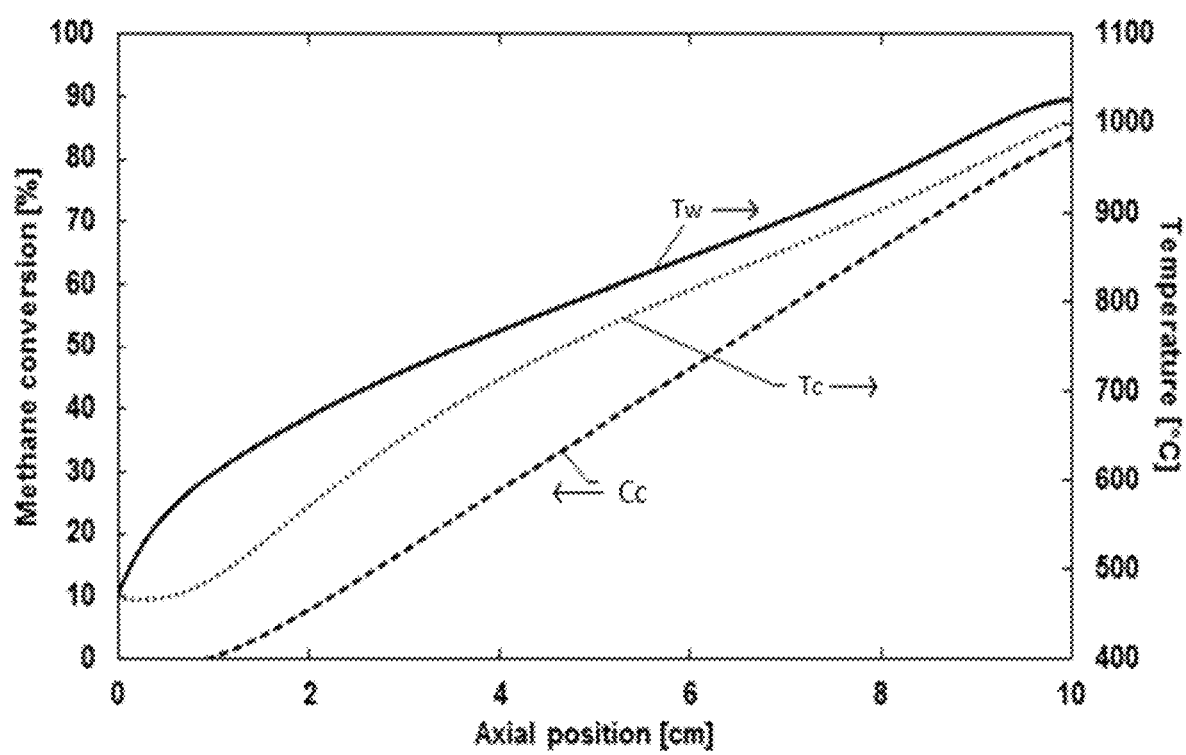
FIGS. 10a and 10b show simulation results for temperatures and gas composition along the length of structured catalyst.
Figure 10B:
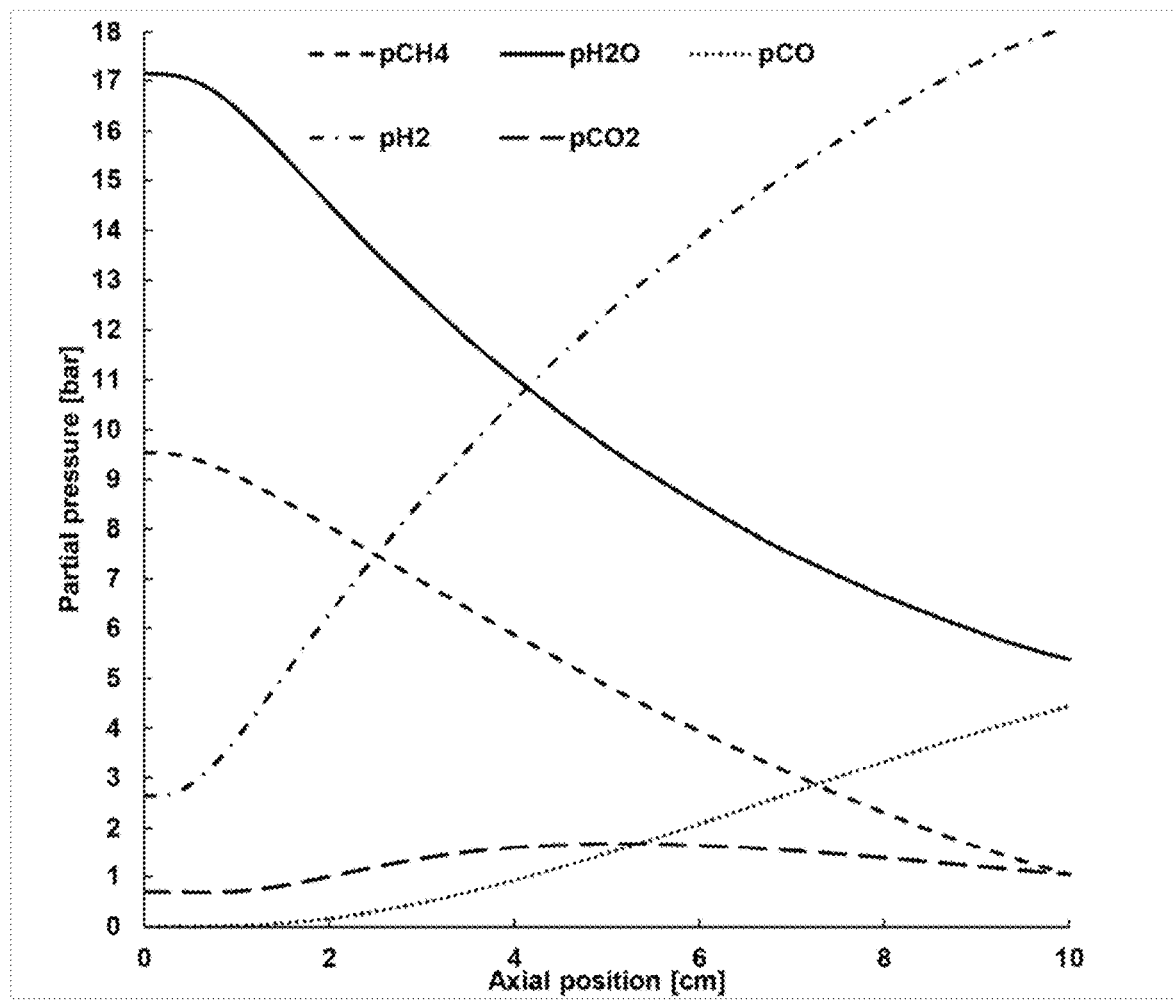

FIGS. 10a and 10b show simulation results for temperatures and gas composition along the length of structured catalyst. A single channel of a structured catalyst is simulated. The length of the structured catalyst of this simulation, and thus of the single channel, is 10 cm. The conditions within the pressure shell/structured catalyst/channel is:

Pressure: 29 barg
T inlet: 466° C.
Total flow: 30 Nl/h
Composition of the feed gas inlet into the reactor/channel: 31.8% methane, 8.8% hydrogen, 2.3% carbon dioxide, and 57.1% steam.

In FIG. 10a, the temperature of the wall of the channel is indicated by Tw and the temperature in the center of the channel is indicated by Tc. Tw and Tc are read from the scale to the right of the graphs. The methane conversion is indicated by Cc and is read from the scale to the left of the graphs.

From FIG. 10a it is seen that the temperature of the wall of a channel in the structured catalyst increases continuously along almost all of the length of the structured catalyst. The temperature is about 480° C. at the first end of the structured catalyst (z=0 cm) and about 1020° C. at the second end of the structured catalyst (z=10 cm). The increase of temperature is steepest the first 10% of the structured catalyst, and only in the last few percent of the length of the structured catalyst, the temperature does not change much. Thus, when the current turns around at the second end of the structured catalyst, from going downwards to upwards in the FIGS. 2a, 2b, 3, 6, 7a, 7b and 8a, the temperature of the walls of the channels of the structured catalyst does not change substantially for increasing z-values. However, FIG. 10a also shows that the temperature in the center of the channel keeps on increasing along the whole length of the structured catalyst. It should be noted, though, that the temperature in the center of the channel remains substantially constant for the first 5-7% of the length of the structured catalyst. This is due to the fact that the gas inlet into the structured catalyst cools the structured catalyst in the vicinity of the first end thereof and due to thermal energy transport delay from the wall to the center of the channel.

In FIG. 10a, the conversion of methane in the center of the channel of the structured catalyst is also shown. It can be seen that the conversion is close to zero for the first 10-12% of the length of the channel and that the conversion subsequently increases monotonously and reaches a value of about 85%. As noted above, small-scale reactors and simulations thereof provide for less than optimal numbers, and that considerably higher conversion is achievable in a real scale reactor system. However, the simulation provides information on the tendencies of the conversion rate and temperature throughout the structured catalyst.

FIG. 10b shows the partial pressures of the principle active gasses within the channel of the structured catalyst of FIG. 10a. From FIG. 10b, it is clear that the partial pressures of steam and methane diminish considerably along the length of the channel of the structured catalyst, whilst the partial pressures of hydrogen and carbon monoxide increase considerably. Moreover, the partial pressure of carbon dioxide increases slightly along the length of the structured catalyst, but decreases towards the highest temperatures where the reverse water gas shift reaction is thermodynamically favored.

EXAMPLES

While the invention has been illustrated by a description of various embodiments and examples while these embodiments and examples have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

The examples described below relate to hydrogen plants with a reforming reactor system comprising a structured catalyst. Such reforming reactor systems are compact reforming reactor systems since the compact macroscopic supports has a high thermal flux when powered by a power source. It is moreover to be noted, that the dimensions of the structured catalysts may be chosen relatively freely, so that the structured catalyst may be almost cubic in outer shape or it may be wider than its height.

The examples all describe operation conditions with high pressure, ranging from 28 bar to 182 bar. Such high pressures within the hydrogen plant are made possible by the configuration of the reforming reactor system 100 since the structured catalyst within the reforming reactor system 100 has high thermal flux upon powering by a power source, is to some extent thermally insulated from the pressure shell, and the pressure drop through the reforming reactor system 100 is very low compared to an SMR. The macroscopic structure of electrically conductive material will obtain the highest temperature within the reforming reactor system 100, while the pressure shell will have a significantly lower temperature due to the thermal insulation between the structured catalyst and the pressure shell. Ideally, the temperature of the pressure shell will not exceed 500° C. When product gas with a high pressure is needed, such as 30 bar or above, the product gas exiting the reforming reactor system can in many cases be used directly, without the use of compressors. This is due to the possibility of pressurizing the feed gas upstream the reforming reactor system. Pressurizing the feed gas will require less energy than the product gas as the volume of the feed is lower than the volume of the product gas as the steam reforming reaction has a net production of molecules. Additionally, one of the feed gas constituents may be pumped which requires significantly less energy compared to gas compression.

In all the examples described below, the feed gas enters the reforming reactor system and flows through the structured catalyst housed therein. When the heat insulation layer of the reforming reactor system is a heat insulating material, the heat insulating material typically makes up most of the space between the structured catalyst and the pressure shell along the walls of the pressure shell so that the feed gas is forced to flow along walls of the macroscopic structure on its way through the pressure shell.

In the examples below, the structured catalysts described in these examples comprise one or more macroscopic structures. The one or more macroscopic structures of the examples below all support a ceramic coating supporting catalytically active material. Advantageously, substantially all the surface of the macroscopic structure supports the ceramic coating supporting the catalytically active material; however, at connections points, e.g. between two adjacent macroscopic structures or between a macroscopic structure and a conductor, the macroscopic structure may be free from ceramic coating in order to facilitate connection between a conductor and the macroscopic structure.

Example 1

An example calculation of the process of the invention is given in Table 1 below. The composition of a third feed gas 11' entering the reforming reactor system 100 is given in Table 1 below. The third feed gas 11' entering the reforming reactor system 100 is a prereformed gas. It has been pressurized to a pressure of 28 bar, viz. 28 kg/cm²·g, and has a temperature of 500° C.

Inside the reforming reactor system 100, a structured catalyst comprising nine macroscopic structures having a square cross section are placed in an array and each macroscopic structure has a size of 0.53 times 0.53 times 2.3 meter. Each macroscopic structure additionally has 17778 channels with a square cross section having a side or edge length of 0.32 cm. Each macroscopic structure has slits parallel to the longitudinal direction thereof, so that clusters of 5 times 5 channels are formed. The clusters are individually insulated from the neighboring cluster, except from the ends, so that the current path through the macroscopic structure is a zigzag path. A current of 200 A and a voltage of ca. 5.5 kV are applied to each macroscopic structure in the reforming reactor system of the invention in order to heat the structured catalyst and thus the gas passing through the structured catalyst, corresponding to a power supplied in the structured catalysts of 9899 kW. If preferred, the nine macroscopic structures can be parallel coupled in groups of three instead of serial coupling all nine, which will decrease the voltage to ca. 1.8 kV, or even parallel coupled as individual monoliths that would require a voltage of ca. 0.6 kV. This must be chosen according to most suitable configuration of associated power supply.

The reforming reactor system 100 of the current configuration has an overall internal diameter of the reforming reactor system of 3.2 m and a total internal height of 5.5 m when the reforming reactor system 100 is made as a cylindrical reactor system with spherical heads. In this specific configuration, the macroscopic structures are placed in a square orientation having a diagonal length of 2.3 m. In all the examples described herein, except for the comparative example, inert material is placed around the structured catalyst to close the gap to the insulation material, adjacent to the pressure shell. The insulation material in example 1 has a cylindrical form with an internal diameter of 2.5 m and a thickness of 0.35 m.

During the passage of the third feed gas 11' through the reforming reactor system 100, the third feed gas 11' is heated by the structured catalyst and undergoes steam reforming to a product gas 12 having an exit temperature of 963° C.

TABLE 1

| Size of macroscopic structure: | |
|---|---|
| Edge size [m] | 0.53 |
| Height [m] | 2.3 |
| Number of macroscopic structures | 9 |
| Total volume of structured catalyst [L] | 5888 |
| Structured catalyst height/diagonal length [—] | 1.02 |

| | Feed gas | Product gas |
|---|---|---|
| T [° C.] | 500 | 963 |
| P [kg/cm² g] | 27.97 | 27.47 |
| $CO_2$ [Nm³/h] | 168 | 727 |
| $N_2$ [Nm³/h] | 26 | 26 |
| $CH_4$ [Nm³/h] | 2630 | 164 |
| $H_2$ [Nm³/h] | 590 | 8545 |
| CO [Nm³/h] | 1 | 1907 |
| $H_2O$ [Nm³/h] | 8046 | 5022 |
| Total flow [Nm³/h] | 11461 | 16391 |
| $\Delta T_{app,SMR}$ [° C.] | | 10 |
| Power [kW] | | 9899 |
| Heat flux [kW/m²] | | 2.2 |
| Space velocity [Nm³/m³/h] | | 1950 |

Example 2

An example calculation of the process of the invention is given in Table 2 below. The composition of a third feed gas 11' entering the reforming reactor system 100 is given in Table 2. The third feed gas 11' entering the reforming reactor system 100 is a prereformed gas. It has been pressurized to a pressure of 28 bar, viz. 28 kg/cm²·g, and has a temperature of 500° C.

Inside the reforming reactor system 100, a structured catalyst comprising 1 macroscopic structure having a square cross section is placed which has a size of 0.4 times 0.4 times 0.35 meter. The macroscopic structure additionally has 10000 channels with a square cross section having a side or edge length of 0.32 cm. The macroscopic structure has slits parallel to the longitudinal direction thereof, so that clusters of 5 times 5 channels are formed. The clusters are individually insulated from the neighboring cluster, except from the ends, so that the current path through the macroscopic structure is a zigzag path. A current of 200 A and a voltage of ca. 500 V are applied to the macroscopic structure in the reforming reactor system of the invention in order to heat the structured catalyst and thus the gas passing through the structured catalyst, corresponding to a power deposited in the structured catalyst of 99 kW.

The reforming reactor system 100 in the current configuration has an overall internal diameter of the reforming reactor system of 1.2 m and a total internal height of 1.5 m when the reforming reactor system is made as a cylindrical reactor system with spherical heads. In this specific configuration, the structured catalyst has a diagonal length of 0.6 m. Inert material is placed around the structured catalysts to close the gap to the insulation material which has an internal diameter of 0.6 m and a thickness of 0.3 m.

During the passage of the third feed gas 11' through the reforming reactor system 100, the third feed gas 11' is heated by the structured catalyst and undergoes steam reforming to a product gas 12 having an exit temperature of 963° C.

TABLE 2

Size of macroscopic structure:

| | |
|---|---|
| Edge size [m] | 0.4 |
| Height [m] | 0.35 |
| Number of macroscopic structures | 1 |
| Total volume of structured catalyst [L] | 55.4 |
| Structured catalyst height/diagonal length [—] | 0.61 |

| | Feed gas | Product gas |
|---|---|---|
| T [° C.] | 500 | 963 |
| P [kg/cm²g] | 27.97 | 27.47 |
| CO2 [Nm³/h] | 1.7 | 7.3 |
| N2 [Nm³/h] | 0.3 | 0.3 |
| CH4 [Nm³/h] | 26.3 | 1.6 |
| H2 [Nm³/h] | 5.9 | 85.4 |
| CO [Nm³/h] | 0 | 19.1 |
| H2O [Nm³/h] | 80.5 | 50.2 |
| Total flow [Nm³/h] | 114.7 | 163.9 |
| $\Delta T_{app,SMR}$ [° C.] | | 10 |
| Power [kW] | | 99 |
| Heat flux [kW/m²] | | 2.2 |
| Space velocity [Nm³/m³/h] | | 2071 |

Example 3

An example calculation of the process within the reforming reactor system of the hydrogen plant is given in Table 3 below. The third feed gas 11' entering the reforming reactor system 100 may be a prereformed gas. It has been pressurized to a pressure of 97 bar, viz. 97 kg/cm²·g, and has a temperature of 500° C.

Inside the reforming reactor system 100, a structured catalyst comprising nine macroscopic structures having a square cross section are placed in an array and each macroscopic structure has a size of 0.53 times 0.53 times 2.3 meter. Each macroscopic structure additionally has 17778 channels with a square cross section having a side or edge length of 0.32 cm. Each macroscopic structure has slits parallel to the longitudinal direction thereof, so that clusters of 5 times 5 channels are formed. The clusters are individually insulated from the neighboring cluster, except from the ends so that the current path through the macroscopic structure is a zigzag path. A current of 200 A and a voltage of ca. 5.5 kV are applied to each macroscopic structure in the reforming reactor system of the invention in order to heat the structured catalyst and thus the gas passing through the structured catalyst, corresponding to a power deposited in the structured catalyst of 9899 kW. If preferred, the nine macroscopic structures can be parallel coupled in groups of three instead of serial coupling all nine, which will decrease the voltage to ca. 1.8 kV, or even parallel coupled as individual monoliths which would require a voltage of ca. 0.6 kV. This must be chosen according to most suitable configuration of associated power supply.

The reforming reactor system 100 of the current configuration could have an overall internal diameter of the reforming reactor system of 3.2 m and a total internal height of 5.5 m when the reforming reactor system 100 is made as a cylindrical reforming reactor system with spherical heads. In this specific configuration, the macroscopic structures 5 are placed in a square orientation having a diagonal length of 2.3 m. Inert material is placed around the structured catalyst to close the gap to the insulation material which has an internal diameter of 2.5 m and a thickness of 0.35 m.

During the passage of the gas 11' through the reforming reactor system 100, the gas 11' is heated by the structured catalyst and undergoes steam reforming to a product gas 12 having an exit temperature of 1115° C.

Since the product gas 12 exiting the reforming reactor system is pressurized to a pressure of 97 bar, no compressors will be needed downstream the reforming reactor system 100 when a high pressure product gas with a pressure of about 100 bar or lower is requested. This reduces the overall cost of a plant of the invention compared to a standard plant with compressors downstream the steam reforming unit.

TABLE 3

Size of macroscopic structure:

| | |
|---|---|
| Edge size [m] | 0.53 |
| Height [m] | 2.3 |
| Number of macroscopic structures | 9 |
| Total volume of structured catalyst [L] | 5888 |
| Structured catalyst height/diagonal length [—] | 1.01 |

| | Gas 11' | Product gas 12 |
|---|---|---|
| T [° C.] | 500 | 1115 |
| P [kg/cm²g] | 96.97 | 96.47 |
| CO2 [Nm³/h] | 111 | 510 |
| N2 [Nm³/h] | 23 | 23 |
| CH4 [Nm³/h] | 2337 | 143 |
| H2 [Nm³/h] | 372 | 7354 |
| CO [Nm³/h] | 1 | 1796 |
| H2O [Nm³/h] | 7111 | 4518 |
| Total flow [Nm³/h] | 9955 | 14344 |
| $\Delta T_{app,SMR}$ [° C.] | | 10 |
| Power [kW] | | 9899 |
| Heat flux [kW/m²] | | 2.2 |
| Space velocity [Nm³/m³/h] | | 1691 |

Example 4

An example calculation of the process within a reforming reactor system 100 of the hydrogen plant 1000 of the invention is given in Table 4 below. The gas 11' entering the reforming reactor system 100 may be a prereformed gas. It has been pressurized to a pressure of 180.5 bar and has a temperature of 500° C.

Inside the reforming reactor system 100, a structured catalyst 10 comprising nine macroscopic structures 5 having a square cross section are placed in an array and each macroscopic structure 5 has a size of 0.53 times 0.53 times 2.3 meter. Each macroscopic structure additionally has 17778 channels with a square cross section having a side or edge length of 0.32 cm. Each macroscopic structure 5 has slits parallel to the longitudinal direction thereof, so that clusters of five times five channels are formed. The clusters are individually insulated from the neighboring cluster, except from the ends, so that the current path through the macroscopic structure has a zigzag path. A current of 200 A and a voltage of ca. 5.5 kV are applied to each macroscopic structure 5 in the reforming reactor system 100 of the invention in order to heat the structured catalyst and thus the gas passing through the structured catalyst, corresponding to a power deposited in the structured catalyst of 9899 kW. If preferred, the nine macroscopic structures can be parallel coupled in groups of three instead of serial coupling all nine, which will decrease the voltage to ca. 1.8 kV, or even parallel coupled as individual monoliths which would require a voltage of ca. 0.6 kV. This must be chosen according to most suitable configuration of associated power supply.

The reforming reactor system 100 in the current configuration could have an overall internal diameter of the reforming reactor system of 3.2 m and a total internal height of 5.5 m when the reforming reactor system 100 is made as a cylindrical reforming reactor system with spherical heads. In this specific configuration, the macroscopic structures are placed in a square orientation having a diagonal length of 2.3 m. Inert material is placed around the structured catalyst to close the gap to the insulation material which has an internal diameter of 2.5 m and a thickness of 0.35 m.

During the passage of the gas 11' through the reforming reactor system 100, the gas 11' is heated by the structured catalyst and undergoes steam reforming to a product gas 12 having an exit temperature of 1236° C. The total flows of the gas 11' and the product gas 12 are lower than the total flow of the gas in Example 3.

Since the product gas 12 exiting the reforming reactor system is already pressurized to a pressure of 181 bar, it is suited for being input into e.g. a hydrotreater of a refinery plant without further pressurizing. Thus, no compressors will be needed between the reforming reactor system and the hydrotreater of the refinery plant. This reduces the overall cost of the plant with a reforming reactor system of the invention.

TABLE 4

Size of macroscopic structure:

| | |
|---|---|
| Edge size [m] | 0.53 |
| Height [m] | 2.3 |
| Number of macroscopic structures | 9 |
| Total volume of structured catalyst [L] | 5888 |
| Structured catalyst height/diagonal length [—] | 1.01 |

| | Gas 11' | Product gas 12 |
|---|---|---|
| T [° C.] | 500 | 1236 |
| P [kg/cm²g] | 180.5 | 180 |
| CO2 [Nm³/h] | 86 | 395 |
| N2 [Nm³/h] | 21 | 21 |
| CH4 [Nm³/h] | 2116 | 95 |
| H2 [Nm³/h] | 279 | 6651 |
| CO [Nm³/h] | 0 | 1713 |
| H2O [Nm³/h] | 6424 | 4094 |
| Total flow [Nm³/h] | 8926 | 12969 |
| $\Delta T_{app,SMR}$ [° C.] | | 10 |
| Power [kW] | 9899 | |
| Heat flux [kW/m²] | 2.2 | |
| Space velocity [Nm³/m³/h] | 1516 | |

Example 5

An example of a hydrogen plant is given in Table 5, which shows the gas composition at relevant places in the chemical plant. The calculation illustrates how the high pressure and temperature durability of the electrically heated reforming reactor system allows for a high reforming temperature and consequently a high methane conversion at the high pressure. Several unit operations are used in an addition to those shown in Table 5, including preheating, desulfurization, cooling, heat exchangers, and phase separations. A person skilled in the art of designing a reforming plant will be able to insert these as required. Table 5 below relates to a hydrogen plant 1000 with two water gas shift units 130a, 130b and cooling of the gas between the reforming reactor system 100 and the first water gas shift unit 130a.

TABLE 5

| | First feed gas 8 | Gas 11' to reforming reactor system 10 | Gas 12 from reforming reactor system 10 | Cooled gas 12 to first WGS unit 130a | Gas 13 to second WGS unit 130b | Gas 14' to gas separation unit 150 | Product gas 16 |
|---|---|---|---|---|---|---|---|
| T [° C.] | 450 | 450 | 1088 | 340 | 238 | 40 | 40 |
| P [kg/cm²g] | 104 | | 99.6 | 99.6 | | 96.9 | 96.2 |
| C₂H₆ [Nm³/h] | 238 | 0 | 0 | 0 | 0 | 0 | 0 |
| CH₄ [Nm³/h] | 26319 | 25861 | 1721 | 1721 | 1721 | 1721 | 1720 |
| CO [Nm³/h] | 0 | 7 | 18657 | 18657 | 4741 | 877 | 877 |
| CO₂ [Nm³/h] | 416 | 1425 | 6915 | 6915 | 20831 | 24694 | 21 |
| H₂ [Nm³/h] | 621 | 4354 | 82264 | 82264 | 96180 | 100045 | 100000 |
| N₂ [Nm³/h] | 193 | 193 | 193 | 193 | 193 | 193 | 193 |
| H₂O [Nm³/h] | 94066 | 92043 | 62413 | 62413 | 48493 | 105 | 105 |

The invention claimed is:

1. A hydrogen plant for producing hydrogen, said hydrogen plant comprising:
a reforming reactor system comprising a first catalyst bed comprising an electrically conductive material and a catalytically active material, said catalytically active material being arranged for catalyzing steam reforming of a feed gas comprising hydrocarbons, a pressure shell housing said first catalyst bed, a heat insulation layer between said first catalyst bed and said pressure shell, and at least two conductors electrically connected to said electrically conductive material and to an electrical power supply placed outside said pressure shell, wherein said electrical power supply is dimensioned to heat at least part of said first catalyst bed to a temperature of at least 500° C. by passing an electrical current through said electrically conductive material, wherein said pressure shell has a design pressure of between 5 and 200 bar,
a water gas shift unit downstream the reforming reactor system, and
a gas separation unit downstream the water gas shift unit.

2. A hydrogen plant according to claim 1, wherein said first catalyst bed comprises a structured catalyst comprising a macroscopic structure of electrically conductive material, said macroscopic structure supporting a ceramic coating, wherein said ceramic coating supports a catalytically active material.

3. A hydrogen plant according to claim 2, wherein the first catalyst bed comprises an array of macroscopic structures.

4. A hydrogen plant according to claim 2, wherein said macroscopic structure has a plurality of parallel channels, a plurality of non-parallel channels and/or a plurality of labyrinthic channels.

5. A hydrogen plant according to claim 2, wherein said macroscopic structure is extruded and sintered structure(s).

6. A hydrogen plant according to claim 2, wherein said macroscopic structure is 3D printed and sintered structure(s).

7. A hydrogen plant according to claim 1, wherein the resistivity of the electrically conductive material is between $10^{-5}$ Ω·m and $10^{-7}$ Ω·m.

8. A hydrogen plant according to claim 2, wherein the material of the macroscopic structure is chosen as a material arranged to generate a heat flux of 500 to 50000 W/m$^2$ by resistance heating.

9. A hydrogen plant according to claim 2, wherein the macroscopic structure and said at least two conductors are connect by a mechanical connection, a welded connection, a brazed connection or a combination thereof.

10. A hydrogen plant according to claim 2, wherein the macroscopic structure has at least one electrically insulating part arranged to increase a principal current path within the macroscopic structure, wherein the at least one electrically insulating part has a length arranged to ensure that a minimum current path between the conductors is larger than the largest dimension of the macroscopic structure.

11. A hydrogen plant according to claim 2, wherein the feed gas comprising hydrocarbon enters into the structured catalyst at a first end and wherein a product gas exits the structured catalyst at a second end, wherein said at least two conductors are connected to the structured catalyst at a position closer to said first end than to the second end.

12. A hydrogen plant according to claim 11, wherein said structured catalyst is constructed to direct an electrical current to run from one conductor to said second end of said structured catalyst and return to a second of the at least two conductors.

13. A hydrogen plant according to claim 1, wherein said pressure shell further comprises one or more inlets close to or in combination with at least one fitting in order to allow a cooling gas to flow over, around, close to, or inside at least one conductor within said pressure shell.

14. A hydrogen plant according to claim 1, wherein the electrically conductive material of the first catalyst bed comprises a resistor embedded in a catalyst material.

15. A hydrogen plant according to claim 14, wherein said embedded resistor supports a ceramic coating, wherein said ceramic coating supports said catalytically active material.

16. A hydrogen plant according to claim 1, wherein the reforming reactor system further comprises a second bed of a second catalyst material upstream said first catalyst bed and within said pressure shell.

17. A hydrogen plant according to claim 1, wherein said gas separation unit comprises one or more of the following units: a flash separation unit, a $CO_2$ wash unit, a pressure swing adsorption unit, a membrane, and/or a cryogenic separation unit.

18. A hydrogen plant according to claim 1, wherein said hydrogen plant comprises two or more water gas shift units.

19. A hydrogen plant according to claim 1, further comprising a heater unit for heating the feed gas upstream said reforming reactor system.

20. A hydrogen plant according to claim 1, said hydrogen plant further comprising a gas purification unit and/or a prereforming unit upstream said reforming reactor system.

21. A hydrogen plant according to claim 1, wherein said reforming reactor system further comprises a control system arranged to control the electrical power supply to ensure that the temperature of the gas exiting the pressure shell of the reforming reactor system lies in a predetermined range and/or to ensure that the conversion of hydrocarbons in the feed gas lies in a predetermined range and/or to ensure the dry mole concentration of methane lies in a predetermined range and/or to ensure the approach to equilibrium of the steam reforming reaction lies in a predetermined range.

22. A process for producing hydrogen from a feed gas comprising hydrocarbons in a hydrogen plant, said hydrogen plant comprising a reforming reactor system with a pressure shell housing a first catalyst bed, said first catalyst bed comprising an electrically conductive material and a catalytically active material, said catalytically active material being arranged to catalyzing steam reforming of a feed gas comprising hydrocarbons, wherein said reforming reactor system is provided with heat insulation between said first catalyst bed and said pressure shell; said process comprising the following steps:
pressurizing said feed gas to a pressure of between 5 and 200 bar,
supplying said pressurized feed gas to the reforming reactor system,
allowing said feed gas to undergo steam reforming reaction over the first catalyst bed and outletting a product gas from the reforming reactor system,
heating said catalytically active material by supplying electrical power via electrical conductors connecting an electrical power supply placed outside said pressure shell to said electrically conductive material, allowing an electrical current to run through said electrically conductive material, thereby heating at least part of the first catalyst bed to a temperature of at least 500° C., letting the product gas into a water gas shift unit downstream the reforming reactor system in order to generate a water gas shifted product gas, condensing water in the water gas shifted product gas and separating this water in a flash separation step, thereby providing a dry water gas shifted product gas, and removing at least $CO_2$ from the dry water gas shifted product gas in a gas separation unit downstream the water gas shift unit.

23. A process according to claim 22, wherein the feed gas is pressurized to between 80 and 180 bar upstream the reforming reactor system.

24. A process according to claim 22, wherein the process comprises heating the feed gas let into the reforming reactor system to a temperature of between 200° C. and 700° C.

25. A process according to claim 22, wherein the first catalyst bed comprises a structured catalyst comprising a macroscopic structure of electrically conductive material, said macroscopic structure supporting a ceramic coating, wherein said ceramic coating supports a catalytically active material, where the macroscopic structure is heated by leading an electrical current through the macroscopic structure, so that a maximum temperature of the macroscopic structure lies between 500° C. and 1300° C.

* * * * *